United States Patent
Bryll et al.

(10) Patent No.: US 7,394,926 B2
(45) Date of Patent: Jul. 1, 2008

(54) MAGNIFIED MACHINE VISION USER INTERFACE

(75) Inventors: Robert Kamil Bryll, Bothell, WA (US); Vidya Venkatachalam, Bellevue, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 491 days.

(21) Appl. No.: 11/241,780

(22) Filed: Sep. 30, 2005

(65) Prior Publication Data
US 2007/0076944 A1 Apr. 5, 2007

(51) Int. Cl.
*G06K 9/00* (2006.01)
(52) U.S. Cl. .................. 382/141; 382/145; 382/152; 382/298; 348/86; 348/92
(58) Field of Classification Search .......... 382/141, 382/143, 145, 147, 152, 298; 348/86, 87, 348/92, 94
See application file for complete search history.

(56) References Cited

U.S. PATENT DOCUMENTS

| | | | |
|---|---|---|---|
| 4,141,032 A | 2/1979 | Haeusler | |
| 4,584,704 A | 4/1986 | Ferren | |
| 4,928,313 A | 5/1990 | Leonard et al. | |
| 5,497,007 A | 3/1996 | Uritsky et al. | |
| 6,347,291 B1 | 2/2002 | Berman | |
| 6,542,180 B1 | 4/2003 | Wasserman et al. | |
| 6,627,863 B2 | 9/2003 | Wasserman | |
| 6,741,074 B2* | 5/2004 | DeBlock et al. | 324/227 |
| 6,868,175 B1 | 3/2005 | Yamamoto et al. | |
| 6,874,420 B2* | 4/2005 | Lewis et al. | 101/485 |
| 6,928,332 B2 | 8/2005 | Gass | |
| 7,029,336 B2* | 4/2006 | Cox | 439/709 |
| 7,112,762 B2* | 9/2006 | Finley et al. | 219/201 |
| 7,124,041 B1* | 10/2006 | Johnson et al. | 702/58 |

OTHER PUBLICATIONS

U.S. Appl. No. 10/978,227, filed Oct. 29, 2004, Bryll et al.
U.S. Appl. No. 10/808,948, filed Mar. 25, 2004, Wasserman.
U.S. Appl. No. 10/632,823, filed Aug. 4, 2003, Venkatachalam.
Bryll, R., "A Robust Agent-Based Gesture Tracking System," doctoral dissertation, Wright State University, Dayton, Ohio, 2004, pp. 33-35.
*QVPAK 3D CNC Vision Measuring Machine Operation Guide*, Version 2.0, Manual No. 4911GB, Series No. 359, Mitutoyo Corporation & Micro Encoder Inc., Kanagawa, Japan, Sep. 1996.
*QVPAK 3D CNC Vision Measuring Machine User's Guide*, Version 7.0, 1st ed., Manual No. 99MCB225A, Series No. 359, Mitutoyo Corporation & Micro Encoder Inc., Kanagawa, Japan, Jan. 2003.

* cited by examiner

*Primary Examiner*—Yosef Kassa
(74) *Attorney, Agent, or Firm*—Christensen O'Connor Johnson Kindness PLLC

(57) ABSTRACT

Improved user interface methods facilitate navigation and programming operations for a magnified machine vision inspection system. Large composite images are determined and stored. The composite images include workpiece features that are distributed beyond the limits of a single magnified field of view of the machine vision system. Despite their size, the composite images may be recalled and displayed in a user-friendly manner that approximates a smooth, real-time, zoom effect. The user interface may include controls that allow a user to easily define a set of workpiece features to be inspected using a composite image, and to easily position the machine vision system to view those workpiece features for the purpose of programming inspection operations for them.

20 Claims, 13 Drawing Sheets

MAGNIFIED MACHINE VISION USER INTERFACE

FIELD OF THE INVENTION

The invention relates generally to machine vision inspection systems, and more particularly to methods for providing an improved user interface usable to facilitate navigation and inspection operations for such systems.

BACKGROUND OF THE INVENTION

Precision machine vision inspection systems (or "vision systems" for short) can be utilized to obtain precise dimensional measurements of inspected objects and to inspect various other object characteristics. Such systems may include a computer, a camera and optical system, and a precision stage that is movable in multiple directions so as to allow the camera to scan the features of a workpiece that is being inspected. One exemplary prior art system that is commercially available is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC *Vision Measuring Machine User's Guide*, published January 2003, and the QVPAK 3D CNC *Vision Measuring Machine Operation Guide*, published September 1996, each of which is hereby incorporated by reference in their entirety. This product, as exemplified by the QV-302 Pro model, for example, is able to use a microscope-type optical system to provide images of a workpiece at various magnifications, and a motion control system to move the stage as necessary to traverse the workpiece surface and inspect and measure features that fall beyond the limits of any single video image.

Machine vision inspection systems generally utilize automated video inspection. U.S. Pat. No. 6,542,180 teaches various aspects of such automated video inspection and is incorporated herein by reference in its entirety. As taught in the '180 patent, automated video inspection metrology instruments generally have a programming capability that allows an automatic inspection event sequence to be defined by the user for each particular workpiece configuration. This can be implemented by text-based programming, for example, or through a recording mode which progressively "learns" the inspection event sequence by storing a sequence of machine control instructions corresponding to a sequence of inspection operations performed by a user, or through a combination of both methods. Such a recording mode is often referred to as "learn mode" or "training mode." Once the inspection event sequence is defined in "learn mode," such a sequence can then be used to automatically acquire (and additionally analyze or inspect) images of a workpiece during "run mode."

The machine control instructions including the specific inspection event sequence (i.e., how to acquire each image and how to analyze/inspect each acquired image) are generally stored as a "part program" or "workpiece program" that is specific to the particular workpiece configuration. For example, a part program defines how to acquire each image, such as how to position the camera relative to the workpiece, at what lighting level, at what magnification level, etc. Further, the part program defines how to analyze/inspect an acquired image, for example, by using one or more video tools such as edge/boundary detection video tools.

Video tools may be used manually to accomplish manual inspection and/or machine control operations. Also, their set-up parameters and operation can be recorded during learn mode, in order to create automatic inspection programs, or "part programs". Such tools may include, for example, edge/boundary detection tools, shape or pattern matching tools, dimension measuring tools, coordinate establishing tools, and the like. For example, such tools are routinely used in a variety of commercially available machine vision inspection systems, such as the QUICK VISION® series of vision systems and the associated QVPAK® software, discussed above.

General purpose visions systems such as Quick Vision™ frequently include a lens turret with lenses of various magnifications. It is common to inspect various aspects of a single workpiece or object using the various magnifications. Furthermore, in industrial inspection environments, very large workpieces are common. A single video image typically encompasses only a portion of the workpiece being observed or inspected, given the desired magnification, measurement resolution, and physical size limitations of such systems. In such cases, "navigation" to various microscopic features to be inspected on a workpiece can be difficult, particularly when the field of view is small compared to the size or distribution of the features to be inspected, and particularly when a number of confusingly similar or identical features are included on the workpiece. In general-purpose visions systems, during learn mode and/or manual operation, it has been conventional to navigate to view particular features on a workpiece either manually, by trial and error, or based on user knowledge of the workpiece design. However, manual navigation may be both slow and prone to errors in distinguishing between similar features.

Alternatively, user interfaces for semi-automatically navigating based on CAD images, or workpiece drawings, or the like, are known. However, in many cases CAD data or workpiece drawings may not exist, or may be in a format that is incompatible with such user interfaces. Also, the differences between the representation of a feature in a CAD-based user interface and the corresponding actual instance of the corresponding feature in a real workpiece image may limit the utility or application of such a CAD interface. For these and other reasons, a more convenient, realistic, and intuitive user interface that enhances the navigation and inspection programming related to relatively small features of relatively large workpieces would desirable.

SUMMARY OF THE INVENTION

Currently, the users of precision machine vision inspection systems may spend a significant portion of their part-programming or manual inspection time navigating to particular features of a workpiece in order to set up appropriate video tools and adjust their parameters. In such systems, improvements in the ease-of-use and GUI features of a user interface that facilitates navigation and/or programming are desirable. The present invention is directed to novel and efficient features of a user interface that facilitates navigation and/or inspection programming related to workpiece features that are distributed beyond the limits of a single field of view of a workpiece. In various embodiments, the user interface includes controls and/or menus or windows that allow a set of individual features to be defined or identified in dependence upon a customized set of parameters. The controls and/or menus or windows and methods employed in the context of various embodiments of the user interface disclosed herein may allow a more realistic workpiece navigation image and/or or allow that image to be updated with a discernibly faster and more convenient response time in response to various user inputs, in comparison to known user interfaces used for similar purposes. In addition, various aspects of the user interface may convey more specific or detailed information regarding features in the workpiece navigation image, in comparison to known user interfaces used for similar purposes, and may provide a more precise and intuitive method to isolate and identify a desired set of features for purposes of navigation and/or inspection programming operations.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings, wherein.

DETAILED DESCRIPTION OF THE PREFERRED EMBODIMENT

Figure 1:
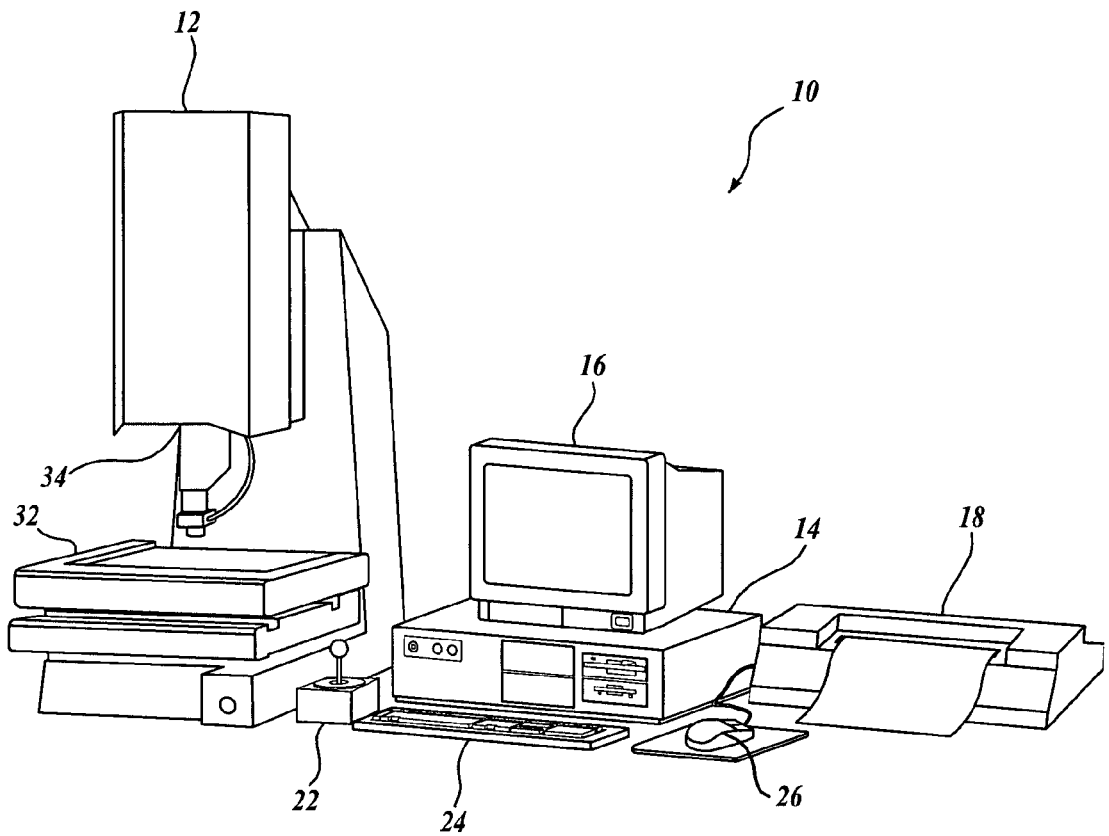
FIG. 1 is a diagram showing various typical components of a general purpose machine vision inspection system.

FIG. 1 is a block diagram of one exemplary machine vision inspection system 10 usable in accordance with the present invention. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10. In various embodiments, an additional monitor or display (not shown) similar to the monitor or display 16 may be included, and the user interface may be displayed on either or both monitors or displays.

The vision measuring machine 12 includes a moveable workpiece stage 32 and an optical imaging system 34 which may include a zoom lens or interchangeable lenses. The zoom lens or interchangeable lenses generally provide various magnifications for the images provided by the optical imaging system 34. The machine vision inspection system 10 is generally comparable to the QUICK VISION® series of vision systems and the QVPAK® software discussed above, and similar state-of-the-art commercially available precision machine vision inspection systems. The machine vision inspection system 10 is also described in copending and commonly assigned U.S. patent application Ser. No. 10/978,227, which is hereby incorporated by reference in its entirety. Various aspects of vision measuring machines and control systems are also described in more detail in copending and commonly assigned U.S. patent application Ser. No. 10/808,948, filed Mar. 25, 2004, and Ser. No. 10/632,823, filed Aug. 4, 2003, which are also hereby incorporated by reference in their entirety.

Figure 2:
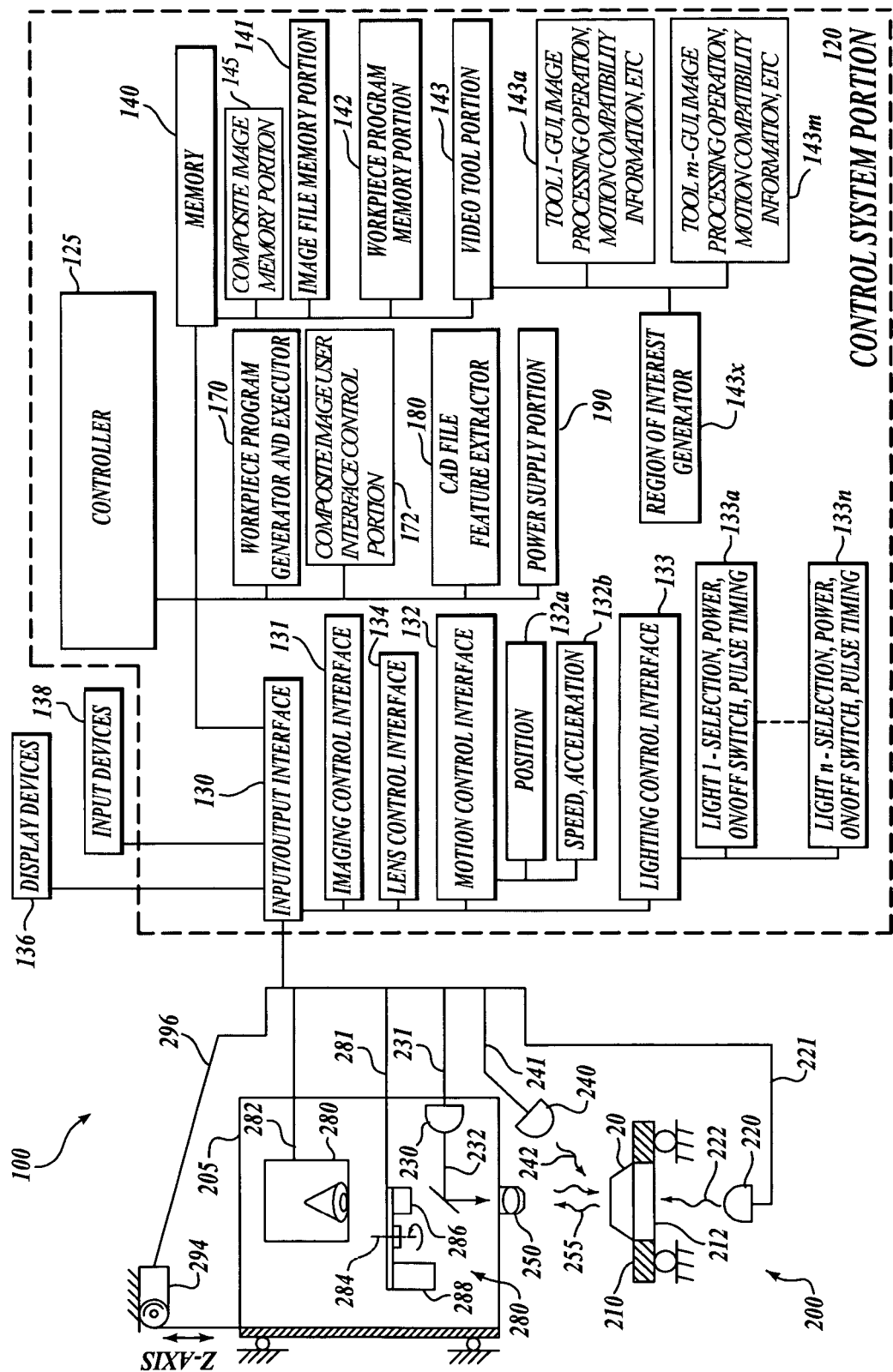
FIG. 2 is a diagram of a control system portion and a vision components portion of a machine vision inspection system.

FIG. 2 is a diagram of a control system portion 120 and a vision components portion 200 of a machine vision inspection system 100 in accordance with the present invention. As will be described in more detail below, the control system portion 120 is utilized to control the vision components portion 200. The vision components portion 200 includes an optical assembly portion 205, light sources 220, 230 and 240, and a workpiece stage 210 having a central transparent portion 212. The workpiece stage 210 is controllably movable along X and Y axes that lie in a plane that is generally parallel to the surface of the stage where a workpiece 20 may be positioned. The optical assembly portion 205 includes a camera system 260, an interchangeable objective lens 250, and may include a turret lens assembly 280, and the coaxial light source 230. Alternatively to the turret lens assembly, a fixed or manually interchangeable magnification-altering lens, or a zoom lens configuration, or the like, may be included. The optical assembly portion 205 is controllably movable along a Z axis that is generally orthogonal to the X and Y axes, by using a controllable motor 294, as described further below.

A workpiece 20 that is to be imaged using the machine vision inspection system 100 is placed on the workpiece stage 210. One or more of the light sources 220, 230, and 240 emits source light 222, 232, or 242, respectively, that is usable to illuminate the workpiece 20. Light emitted by the light sources 220, 230, and/or 240 illuminates the workpiece 20 and is reflected or transmitted as workpiece light 255, which passes through the interchangeable objective lens 250 and the turret lens assembly 280 and is gathered by the camera system 260. The image of the workpiece 20, captured by the camera system 260, is output on a signal line 262 to the control system portion 120.

The light sources 220, 230, and 240 that are used to illuminate the workpiece 20 can include a stage light 220, a coaxial light 230, and a surface light 240, such as a ring light or a programmable ring light, all connected to the control system portion 120 through signal lines or busses 221, 231, and 241, respectively. As a primary optical assembly of the machine vision inspection system 100, the optical assembly portion 205 may include, in addition to the previously discussed components, other lenses, and other optical elements such as apertures, beam-splitters and the like, such as may be needed for providing coaxial illumination, or other desirable machine vision inspection system features. When it is included as a secondary optical assembly of the machine vision inspection system 100, the turret lens assembly 280 includes at least a first turret lens position and lens 286 and a second turret lens position and lens 288. The control system portion 120 rotates the turret lens assembly 280 along axis 284, between at least the first and second turret lens positions, through a signal line or bus 281.

The distance between the workpiece stage 210 and the optical assembly portion 205 can be adjusted to change the focus of the image of the workpiece 20 captured by the camera system 260. In particular, in various exemplary embodiments, the optical assembly portion 205 is movable in the vertical Z axis direction relative to the workpiece stage 210 using a controllable motor 294 that drives an actuator, a connecting cable, or the like, to move the optical assembly portion 205 along the Z axis. The term Z axis, as used herein, refers to the axis that is intended to be used for focusing the image obtained by the optical assembly portion 205. The controllable motor 294, when used, is connected to the input/output interface 130 via a signal line 296.

As shown in FIG. 2, in various exemplary embodiments, the control system portion 120 includes a controller 125, an input/output interface 130, a memory 140, a workpiece program generator and executor 170, a composite image user interface control portion 172, a CAD file feature extractor 180, and a power supply portion 190. It will be appreciated that each of these components, as well as the additional components described below, may be interconnected by one or more data/control buses and/or application programming interfaces, or by direct connections between the various elements.

The input/output interface 130 includes an imaging control interface 131, a motion control interface 132, a lighting control interface 133, and a lens control interface 134. The motion control interface 132 includes a position control element 132a, and a speed/acceleration control element 132b. However, it should be appreciated that in various exemplary embodiments, such elements may be merged and/or indistinguishable. The lighting control interface 133 includes lighting control elements 133a-133n, which control, for example, the selection, power, on/off switch, and strobe pulse timing if applicable, for the various corresponding light sources of the machine vision inspection system 100, such as the light sources 220, 230, and 240.

The memory 140 includes an image file memory portion 141 that stores acquired workpiece images and a composite image memory portion 145 that stores workpiece composite images that are determined according to the operations of the composite image user interface control portion 172, as described in greater detail below. In various embodiments, the composite image memory portion 145 and the image file memory portion 141 may be merged and/or indistinguishable. The memory 140 also includes a workpiece program memory portion 142 that may include one or more part programs, or the like, and a video tool portion 143. The video tool portion 143 includes various video tool portions, exemplified by the illustrated video tool portions 143a-143m, which determine the GUI, image processing operation, etc., for each of the corresponding video tools. The video tool portion 143 also includes a region of interest generator 143x that supports automatic, semi-automatic and/or manual operations that define various regions of interest that are operable in various video tools included in the video tool portion 143.

In general, the memory portion 140 stores data usable to operate the vision system components portion 200 to capture or acquire an image of the workpiece 20 such that the acquired image of the workpiece 20 has desired image characteristics. The memory portion 140 further stores data usable to operate the machine vision inspection system 100 to perform various inspection and measurement operations on the acquired images, either manually or automatically, and to output the results through the input/output interface 130. The memory portion 140 also contains data defining a graphical user interface operable through the input/output interface 130.

The signal lines or busses 221, 231 and 241 of the stage light 220, the coaxial light 230, and the surface light 240, respectively, are all connected to the input/output interface 130. The signal line 262 from the camera system 260 and the signal line 296 from the controllable motor 294 are connected to the input/output interface 130. In addition to carrying image data, the signal line 262 may carry a signal from the controller 125 that initiates image acquisition.

One or more display devices 136 and one or more input devices 138 can also be connected to the input/output interface 130. The display devices 136 and input devices 138 can be used to display a user interface, which may include various graphical user interface (GUI) features that are usable to perform inspection operations, and/or to create and/or modify part programs, to view the images captured by the camera system 260, and/or to directly control the vision system components portion 200. In a fully automated system having a predefined part program (or workpiece program), the display devices 136 and/or the input devices 138 may be omitted.

With regard to the CAD file feature extractor 180, information, such as a CAD file representing a workpiece is frequently available in industrial applications of machine vision inspection systems. The locations of edges and boundaries in the CAD file representation may be determined manually, in a semi-automated fashion, or fully automatically, in such information may be useful for workpiece programming or navigating to a desired workpiece feature.

In various exemplary embodiments, when a user utilizes the machine vision inspection system 100 to create a workpiece image acquisition program for the workpiece 20, the user generates workpiece program instructions either by explicitly coding the instructions automatically, semi-automatically, or manually, using a workpiece programming language, or by generating the instructions by moving the machine vision inspection system 100 through an image acquisition training sequence such that the workpiece program instructions capture the training sequence. This process is repeated for multiple images in a set of images that are to be captured. The workpiece program generator and executor 170 supports generation of the workpiece program instructions and creation and storing of an associated workpiece part program file, which may be stored in the workpiece program memory portion 142, and/or output. The workpiece program generator and executor 170 also supports execution of program instructions of such workpiece part programs. In many cases, such workpiece program instruction generation, including workpiece-specific "training" of various video tools, is commonly accomplished using "learn mode" or "training mode" operations, as outlined previously and described in greater detail in various references incorporated herein.

Once a set of workpiece image acquisition instructions are defined, the control system 120, under control of the controller 125 and/or the workpiece program generator and executor 170, executes the instructions and commands the camera system 260 to capture one or more images of the workpiece 20 according to the instructions. The instructions may include, for example, instructions that cause the machine vision inspection system to manipulate the workpiece stage 210 and/or the camera system 260 at certain speed(s) such that a particular portion of the workpiece 20 is within the field of view of the camera system 260 and at a desired focus state for each of a set of images to be acquired. In addition to the program instructions that control the relative movement of the camera and the workpiece, the workpiece image acquisition program also needs to include program instructions that activate one or more of the light sources 220-240 to provide a desired illumination of the workpiece 20 during each image acquisition. The control system 120 will then, input the captured image(s) through the input/output interface 130 and store the captured or acquired image(s) in the memory 140. The controller 125 may also display the captured images on the display device 136.

The control system portion 120 may further execute instructions to recall captured and stored workpiece inspection images, to inspect and analyze workpiece features in such workpiece inspection images, and to store and/or output the inspection results. These analysis and inspection methods are typically embodied in various video tools included in the video tool portion 143 of the memory 140. Some of these tools, including edge detection tools, shape or pattern matching tools, dimension measuring tools, coordinate matching tools, auto focus tools, and the like, for example, are routinely available in a variety of commercially available machine vision inspection systems, such as the QUICK VISION® series of vision systems and the associated QVPAK® software, discussed above, and in the references incorporated herein.

After the image inspection/analysis operations using one or more of these video tools is completed, the control system 120 may further execute instructions that output the results of each analysis/inspection operation to the input/output interface for outputting to various display devices 136, such as a video display, printer, and the like. The control system 120 may also store the results of each inspection operation in the memory 140.

Figure 3:
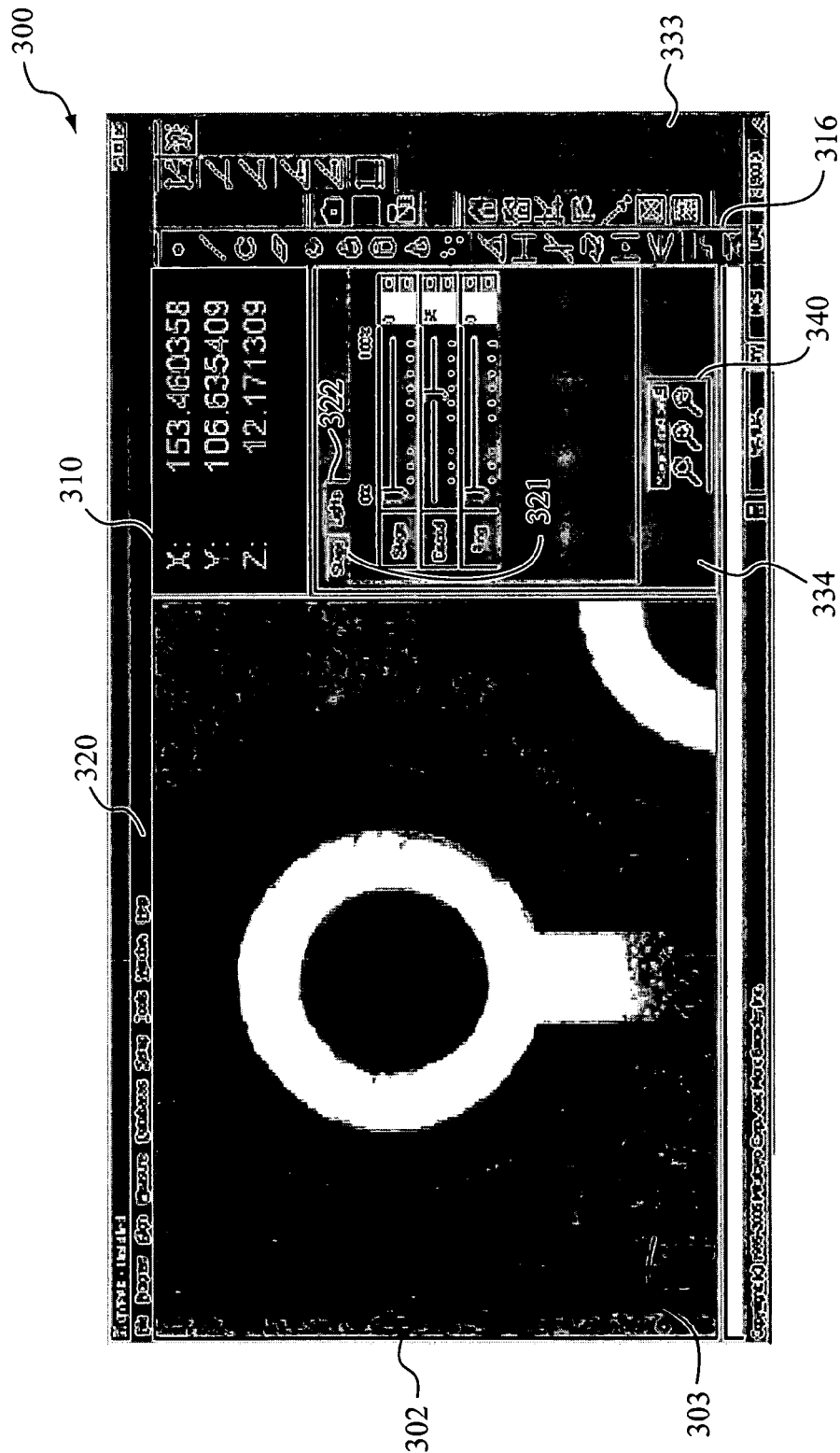
FIG. 3 is a sample screen shot illustrating a portion of a user interface for a machine vision inspection system.

FIG. 3 shows a sample screen shot illustrating a user interface portion 300 of one exemplary user interface for a machine vision inspection system. The user interface portion 300 includes a display area 302 that shows a "real time" workpiece image 303 from the machine vision inspection system. In FIG. 3, the real time workpiece image 303 is magnified at a level that is typical for many precision machine vision inspection operations. A display area 310 includes a digital readout of the X-Y-Z workpiece coordinates corresponding to the acquired image displayed in the display area 302, in a current coordinate system. A display area 320 includes an exemplary menu bar including respective menu elements or menu buttons, e.g., "File", "Window", "Help", "Client" etc., each of which may be activated according to known methods to reveal respective menus that include elements that may be activated to perform various operations and/or control which elements of the user interface are currently displayed. A display area 333 may include various tool bars and or buttons, for example a feature measurement tool bar 316, or a video tool bar (not shown), or the like. The various toolbars and/or buttons that are displayed, or not displayed, in the display area 333 may be controlled by user selections using the menu bar in the display area 320. A display area 334 that may include various tabbed control displays represented by the stage control display tab 321 and the light control display tab 322. The various control displays are usable to manually control various operations and/or parameters of the machine vision inspection system. A display area 340 shows icons usable to control the current magnification of the machine vision inspection system, for example, by controlling the position of the power turret 280, shown in FIG. 2.

As previously outlined, it is common to inspect various aspects of a single workpiece or object using various magnifications. Furthermore, in industrial environments, very large workpieces, and high magnifications, are common for precision machine vision inspection systems. A single video image typically encompasses only a portion of the workpiece being observed or inspected, given the desired magnification, measurement resolution, and physical size limitations of such systems.

The composite image determination, analysis and navigation methods of the present invention provide novel and efficient features that facilitate navigation and/or inspection programming related to workpiece features that are distributed beyond the limits of a single field of view or image of a workpiece. The composite image interface and navigation methods may be implemented using a composite image user interface portion, as will be described in greater detail below. In one embodiment, the composite image user interface portion may be implemented as an integrated window or additional display area of a machine vision user interface, such as that shown in FIG. 3. In such a case, the composite image user interface portion may be activated using a selection under the "Window" menu element in the display area 320.

In various other embodiments, the composite image user interface portion may be implemented in a "client application", for example, through an applications programming interface (API), such as the API of the commercially available QUICK VISION® series of vision systems and the associated QVPAK® software, discussed above. Briefly, an API provides a format for a prescribed set of commands, event information, and/or data input/output exchange that can be used to facilitate cooperative operation between two programs. In one embodiment, the composite image user interface portion may be incorporated in a specialized client application program, for example a client application program specifically targeted to enhance the convenience and speed of printed circuit board inspection part programming. In such a case the specialized client application program may be directly activated using a selection under the "Client" menu element and the composite image user interface portion may be indirectly activated as part of that program. In another embodiment, the composite image user interface portion may be implemented as a stand-alone client program, for example, providing an "add-on" program or a retrofit program that enhances the ease-of-use and utility of an existing machine vision system user interface. In such a case the composite image user interface portion may be directly activated using a selection under the "Client" menu element. In either case, the interaction of the composite image user interface portion in cooperating with the remainder of the machine vision system user interface may implement any or all of the various features described herein.

Figure 4:
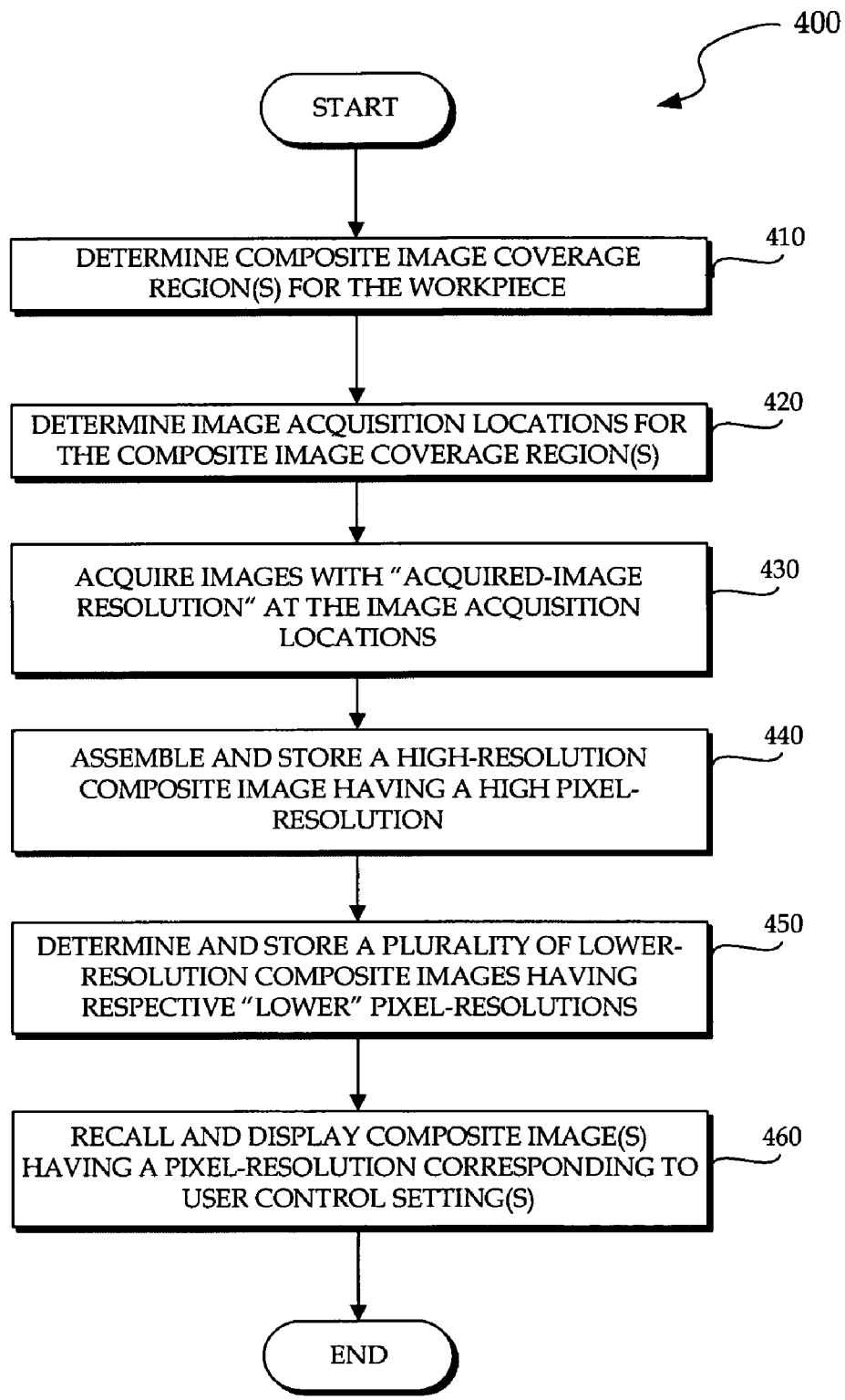
FIG. 4 is a flow diagram illustrative of one embodiment of a routine for determining and displaying composite images.

FIG. 4 is a flow diagram illustrative of one embodiment of a routine 400 usable for determining and displaying composite images in a composite image user interface portion. At a block 410, operations are performed to determine a composite-image preparation region for the workpiece. Briefly, the composite-image preparation region defines the size and location of a region on the workpiece that will be included in the composite images determined according to the operation outlined below. Exemplary methods and controls usable to define the composite-image preparation region are described below with reference to FIG. 5.

At a block 420, image acquisition locations are determined for the composite-image region. Briefly, a set of image acquisition locations may be determined such that all portions of the composite-image preparation region are included in at least one image of a set of images acquired at the set of image acquisition locations. Ideally, a step size between image acquisition locations may be determined along the X and Y directions, such that the resulting images tile the composite-image preparation region with a known overlap between adjacent images, which may be little or no overlap. The step size may be determined, for example, based on the vision system magnification, the camera imaging area dimensions and/or the pixel spacing and count along the pixel rows and columns.

At a block 430, a set of images are acquired at the set of image acquisition locations determined at block 420. In various embodiments, the operations of this block are implemented as an automatically executed step and repeat operation that follows a regular pattern of motion through the set of acquisition locations. In one embodiment, these images will have a "pixel-resolution", that is "pixels per unit distance on the workpiece" that is the highest possible pixel-resolution for the camera system and magnification used to acquire the images, referred to herein as the "acquired image resolution" or the "acquired image pixel-resolution." The method of determining the lighting conditions and camera focus distance for each of the acquired images may depend upon the type of workpiece being imaged, and the composite-image portion user interface may include control elements that allow the user to indicate the type of workpiece or the preferred method of determining the lighting and camera focus. For example, for flat and relatively consistent workpieces (e.g., printed circuit boards), a manually or automatically determined light setting used to produce a satisfactory image just prior to executing the set of image acquisitions, may be reused for each acquired image. For non-flat workpieces having inconsistent surfaces, an autofocus operation and an automatic light adjustment operation may be performed at each image acquisition location prior to acquiring an image. Various methods for automatically determining light settings are included in U.S. Pat. No. 6,627,863, which is hereby incorporated by reference in its entirety. For the most difficult workpieces, the machine vision system may automatically step through the image acquisition locations, and prompt the user to set the lighting and focus, and manually trigger the image acquisition, at each location, before automatically moving to the next image acquisition locations. The method of camera focus may even include acquiring a plurality of images at various focus distances for each image acquisition location. A synthetic "acquired image" having an extended depth of field may then be determined for each respective image acquisition location, based on the plurality of images corresponding to the various focus distances. Various methods for determining such extended depth of field images are included in U.S. Pat. Nos. 4,141,032, and 4,584,704, which are hereby incorporated herein by reference in their entirety.

At a block 440, the set of acquired images are used to assemble a high-resolution composite image having a relatively high pixel-resolution, and the image is stored. The set of acquired images may be combined or "tiled" in the proper positions based on their known acquisition locations, and dimensions, to form the composite image. In one embodiment, the high-resolution composite image is formed directly from the acquired images, and has a pixel-resolution that is the same as the acquired image resolution. However, when a composite image is assembled directly from a large number of high magnification images, corresponding to a large composite image region, the storage requirements and recall and display times for the composite image may become inconvenient. For purposes of navigation, a composite image having the acquired image pixel-resolution may not be necessary or efficient. Therefore in some embodiments, the high-resolution composite image may have a pixel-resolution as low as one half, or one quarter, of the acquired image pixel-resolution. In various embodiments, the pixel-resolution may be based at least partly on the number of acquired images used to assemble the high-resolution composite image, or a maximum number of pixels or a storage limit allowed for the high-resolution composite image, or a storage limit allowed for a complete set of composite images to be determined for use with the composite image interface portion, or a combination of any of these considerations. In various embodiments, a high-resolution composite image having a pixel-resolution that is less than an acquired image pixel-resolution, may be assembled by sub-sampling the pixels of the acquired images at regular intervals, or by otherwise scaling or interpolating the acquired images to provide a high-resolution composite image with a pixel-resolution that is less than the acquired image pixel-resolution.

At a block 450, a plurality of respective lower-resolution composite images having respective pixel-resolutions lower than the high-resolution composite image, are determined and stored. In one embodiment, each of the composite images covers approximately the same portion of the workpiece, and each composite image has a different pixel-resolution. Therefore, each composite image has a different size and/or "magnification" when displayed in the composite image user interface portion. In various embodiments, the lowest-resolution composite image is determined with a pixel-resolution such that its size allows the entire composite image to be displayed at one time in the composite image user interface portion. In one embodiment, the remainder of the plurality of lower-resolution composite images are determined with respective pixel-resolutions that are distributed approximately evenly between the pixel-resolution of the high-resolution composite image and the pixel-resolution of the lowest resolution composite image. In one embodiment, the respective lower-resolution composite images may be determined by sub-sampling, or by otherwise scaling or interpolating, a previously-determined composite image that has a relatively higher-pixel-resolution. In various embodiments, such a plurality of composite images may be used to provide a composite image control feature that responds approximately instantly to user control operations and approximates the effect of using a "zoom lens" with the composite images, as described further below.

At a block 460, the previously determined and stored composite images are recalled, displayed, and replaced in the display by other composite images, according to the setting of a user control provided in the composite image user interface portion. The control is sometimes referred to as a composite image "zoom" control herein. In various embodiments of the routine 400, the total number of stored composite images (including the high-resolution composite image and the lower resolution composite images) may be as small as three. However, although three composite images may be sufficient to facilitate convenient workpiece navigation, a disconcerting "jumping" zoom effect may result. Therefore in various other embodiments, at least six composite images may be determined and stored. For an even smoother approximation of a zoom effect, especially for composite images that are intended to span a large range of pixel-resolutions, at least nine composite images may be determined and stored.

Figure 5:
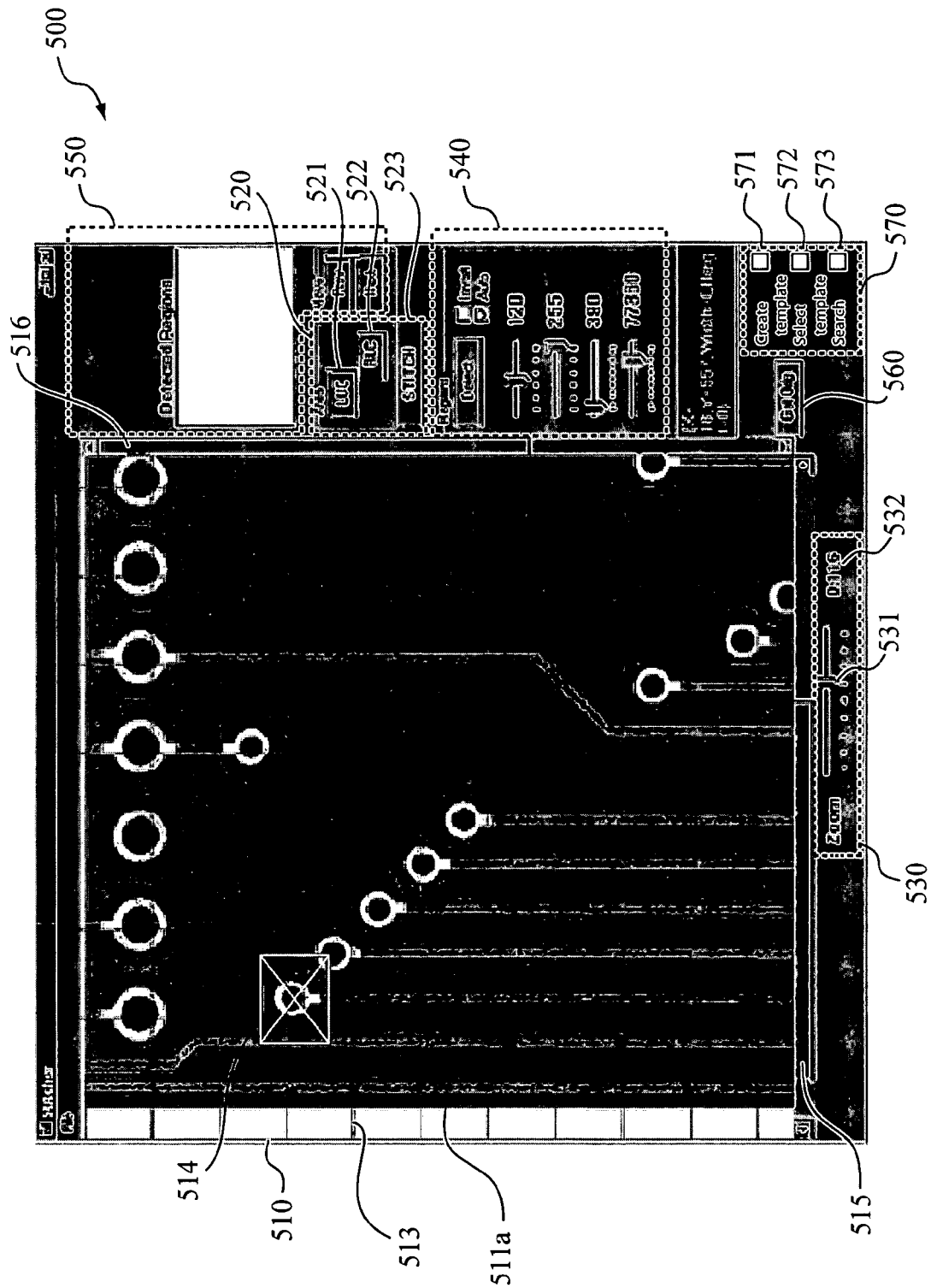
FIG. 5 is a sample screen shot illustrating a composite image portion of a user interface for a machine vision inspection system, including a first workpiece composite image having a relative coarse pixel-resolution.

FIG. 5 shows a sample screen shot illustrating one exemplary composite image user interface portion 500, usable in a user interface for a machine vision inspection system. The composite image user interface portion 500 includes a display area 510 that shows a composite image 511a of a printed circuit board workpiece. It should be appreciated that the composite image 511a is one of a previously determined and stored set of composite images "511x" that have various respective pixel-resolutions, for example, as outlined above with reference to FIG. 4. The display area 510 includes sliding scroll controls 515 and 516, that may be used to control which portion of the composite image 511a is displayed in the display area 510.

The display area 510 also includes an optional grid overlay 513. In various embodiments, the grid overlay 513 may help convey to the user a sense of the size relationship between a composite image displayed in the display area 510, and the real-time image 303 displayed in the display area 302 (see FIG. 3). For this reason, in the embodiment shown in FIG. 5, the size of the rectangular cells of the grid overlay 513 correspond to the size of the current field of view (FOV) of the machine vision inspection system, which often approximately corresponds to the size of the display area 302. Such a grid cell size may be advantageous for helping the user instantly understand the size relationship between the images in the display areas 510 and 302, and intuitively navigate the workpiece using the machine vision inspection system. However, in other embodiments, the grid cell size may be set to a desired unit of length on the workpiece, or any other size that is useful in a particular application, or the grid overlay 513 may be omitted, or subject to user "on/off" control.

The display area 510 also includes a field of view (FOV) indicator 514 at a location that corresponds to the current location of the FOV of the machine vision inspection system relative to the composite image 511a. Thus, the FOV indicator location may be updated in real time based on the state of the machine vision inspection system, and the user may intuitively understand the location relationship between the composite image 511a, and the real-time image 303 displayed in the display area 302 (see FIG. 3). The FOV indicator 514 shown in FIG. 5 indicates the size as well as the location of the current FOV of the machine vision inspection system relative to the composite image 511a. Thus, if the magnification of the machine vision inspection system is changed, or the composite image displayed in the display area 510 is changed (that is, the pixel-resolution of the displayed composite image is changed), the size of the FOV indicator 514 in the display area 510 may be updated accordingly. However, in various other embodiments, a FOV indicator may indicate the location of the FOV without indicating the FOV size, and still have substantial utility.

The composite image user interface portion 500 also includes a display area 520 including various controls for setting a composite image coverage region, that is, the region of the workpiece that is to be processed and included in the composite images, for example, as previously described with reference to FIG. 4. In the example shown in FIG. 5, the display area 520 includes an "LUC" button 521, an "RLC" button 522, and a "STITCH" button 523. The button 521 is used to set the "left upper corner" of the coverage region, once the user has used the user interface portion 300 (see FIG. 3) to locate the camera at the desired "left upper corner" position on the workpiece. After the user has re-positioned the camera at the desired "right lower corner" of the coverage region, the button 522 is then similarly used. After these operations, the STITCH button 523 may be used to activate an automatic procedure that determines and stores a number of composite images having a size that corresponds to the coverage region, for example, as previously described with reference to FIG. 4.

The composite image user interface portion 500 also includes a display area 530 that may include a sliding zoom control pointer 531 and a ratio display 532. As outlined with reference to FIG. 4 above, previously determined and stored composite images may recalled, displayed, and replaced in the display area 510 by other composite images, according to the setting of the user-controlled zoom control pointer 531. The ratio display 532 shows the dimension ratio between the size of a feature in the currently displayed composite image, and the size of that feature in the real-time image 303 (see FIG. 3).

The composite image user interface portion 500 also includes display areas 540 and 550, and a "GET ORIG" button 560, all described in greater detail below. Briefly, the display area 540 includes various "region determining" controls, used when detecting or determining regions in a composite image. The display area 550 includes a region listing area and related controls, for reviewing and manipulating the detected regions. The "GET ORIG" button 560 recalls a stored composite image into the display area 510. The composite image user interface portion 500 also includes a display area 570 that includes various controls related to searching a composite image for features resembling a particular template or pattern. A "Create template" control button 571 initiates operation of a template and/or pattern creation user interface portion, when activated. A "Select template" control button 572 activates operation of a template and/or pattern recall user interface portion, when activated. A "Search" control button 573 activates operation of a template and/or pattern searching user interface portion, when activated. All of the foregoing user interface portions related to template and pattern searching may include the same template creation method and interface elements used for conventional images in an existing commercial machine vision system, if desired. The only difference is that the associated operations are directed to the currently-displayed composite image in this case.

The user may control the X-Y motion of the machine vision system using the composite image user interface portion 500. In one example of a "one click" method, the user may position a cursor at a selected position relative to the composite image in the display area 510, and input a control signal (e.g., by pressing a mouse button designated to activate "one click motion", or the like) that initiates a motion of the machine vision system based on the selected position, such that a point on the workpiece that corresponds to the selected position is positioned in the field of view of the camera system. In another example, the user may drag the FOV indicator to a selected position relative to the composite image in the display area 510, which may automatically initiate a motion of the machine vision system that follows the location of the FOV in the composite image.

Figure 6:
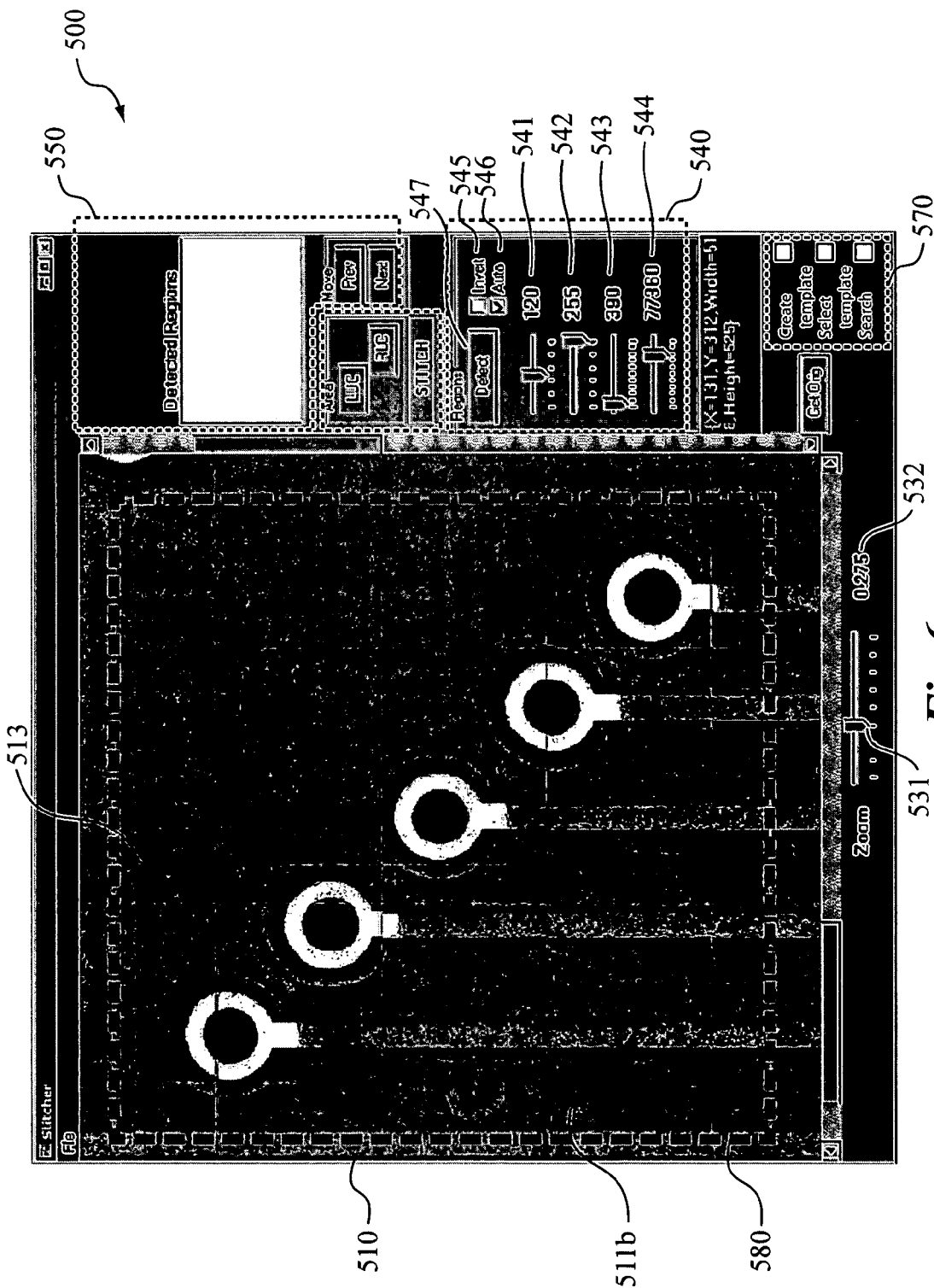
FIG. 6 is a sample screen shot illustrating the composite image portion of a user interface of FIG. 5, including a first workpiece composite image having a relative finer pixel-resolution.

FIG. 6 shows a sample screen shot illustrating the exemplary composite image user interface portion 500 shown in FIG. 5, with a portion of a different composite image 511b displayed in the display area 510. It will be understood that the underlying complete composite image 511b covers the entire composite image coverage region, as does the composite image 511a (see FIG. 5), except the composite image 511b has a higher pixel-resolution, and therefore is shown "magnified" relative to the composite image 511a. In FIG. 6 the zoom control pointer 531 and ratio display 532 correspond to the composite image 511b. FIG. 6 also includes a region of interest (ROI) indicator 580 overlying the composite image of 511b. The composite image ROI indicator 580 may be set by the user. For example, in one embodiment, the user may position a cursor (not shown) at the desired left upper corner of a composite image ROI, hold down an input device button to enter that point and then drag the cursor to the desired right lower corner of the ROI, and enter that point by releasing the input device button, to define the composite image ROI. The corresponding composite image ROI indicator 580 will then appear, or remain, on the display area 510. It will be appreciated that various image processing operations may be performed on the composite image, if desired. The composite image ROI indicator 580 is a useful tool for defining a region of the composite image in which the image processing operations may be performed.

As previously outlined, the display area 540 includes various "region determining" controls, including region parameter controls, usable to detect or determine regions in a composite image, and more specifically within an ROI defined by the composite image ROI indicator 580. In the exemplary embodiment shown in FIG. 6 the display area 540 includes an "Auto" checkbox control 546, an "Invert" checkbox control 545, a "Detect" button 547, an intensity lower limit control 541, an intensity upper limit control 542, a minimum region size control 543, and a maximum region size control 544, which each include a slider control and a corresponding displayed value, in this example.

When the user activates the "Detect" button 547, regions will be automatically determined in a manner that depends on the various control settings, and the results are indicated in the display 510. Region determining may generally include any now known or later developed region identification methods, and may include a combination of operations such as filtering operations, opening and closing operations, connectedness analysis, and the like. Region determining algorithms are well-known in the field of image processing and may be obtained and/or applied from various readily-available image processing routine libraries.

In one example of operation, the displayed values of the lower limit control 541, and the upper limit control 542, may be eight-bit grayscale values. The intensity of pixels to be included in the determined regions must fall within the range of values indicated by the settings of these controls, when the "Auto" checkbox control 546 is not checked. Expressed another way, the settings of these controls act as threshold values for admitting pixels as candidates for inclusion in a region. The determined regions (which may be regarded as comprising "connected components") must furthermore have a size that falls within the range of values indicated by the settings of the minimum region size control 543 and the maximum region size control 544, which may be expressed as numbers of pixels or other applicable area units (e.g. square millimeters).

The "Auto" checkbox control 546, and the "Invert" checkbox control 545 may operate as follows. The "Invert" checkbox control 545 generally inverts (creates a "negative") of the thresholded operations applied to composite image ROI. In one embodiment, if the "Invert" control 545 is unchecked, the image pixels in the composite image ROI are admitted as candidates for inclusion in a region if their grayscale values are within the interval specified by the lower limit control 541, and the upper limit control 542. If the "Invert" control 545 is checked, the image pixels in the composite image ROI are admitted as candidates for inclusion in a region if their grayscale values are outside the interval specified by the lower limit control 541, and the upper limit control 542.

The "Auto" checkbox control 546 deactivates the limits indicated by the lower limit control 541 and the upper limit control 542, and enables automatic thresholding operations in the composite image ROI. In one embodiment, the automatic thresholding operations compute only a single threshold, for example, by using Otsu's algorithm, or the like. Such automatic thresholding algorithms are well-known in the field of image processing and may be obtained and/or applied from various readily-available image processing routine libraries. In one embodiment, when the "Auto" checkbox control 546 is checked (and the "Invert" control 545 is unchecked), the pixels in the composite image ROI are admitted as candidates for inclusion in a region if their grayscale values are higher than the computed threshold. When the "Auto" checkbox control 546 is checked and the "Invert" control 545 is also checked, the pixels in the composite image ROI are admitted as candidates for inclusion in a region if their grayscale values are lower than the computed threshold. In many cases using the automatic thresholding provides reasonable results if the histogram of grayscales in the selected image area is roughly bimodal, for example if the composite image includes features to be inspected that have a relatively uniform image intensity that differs significantly from the background.

In various embodiments, the determined regions are indicated in the display area 510, and respond in real-time, or near real-time, to alterations in any "active" slider control settings and/or other region determining controls described above. Thus, the user may observe the displayed determined regions, and simply adjust the various slider controls and/or other region determining controls until the determined regions are the ones that the user desires. For example, the determined regions may generally correspond to features of the workpiece, that the user desires to inspect or measure.

Figure 7:
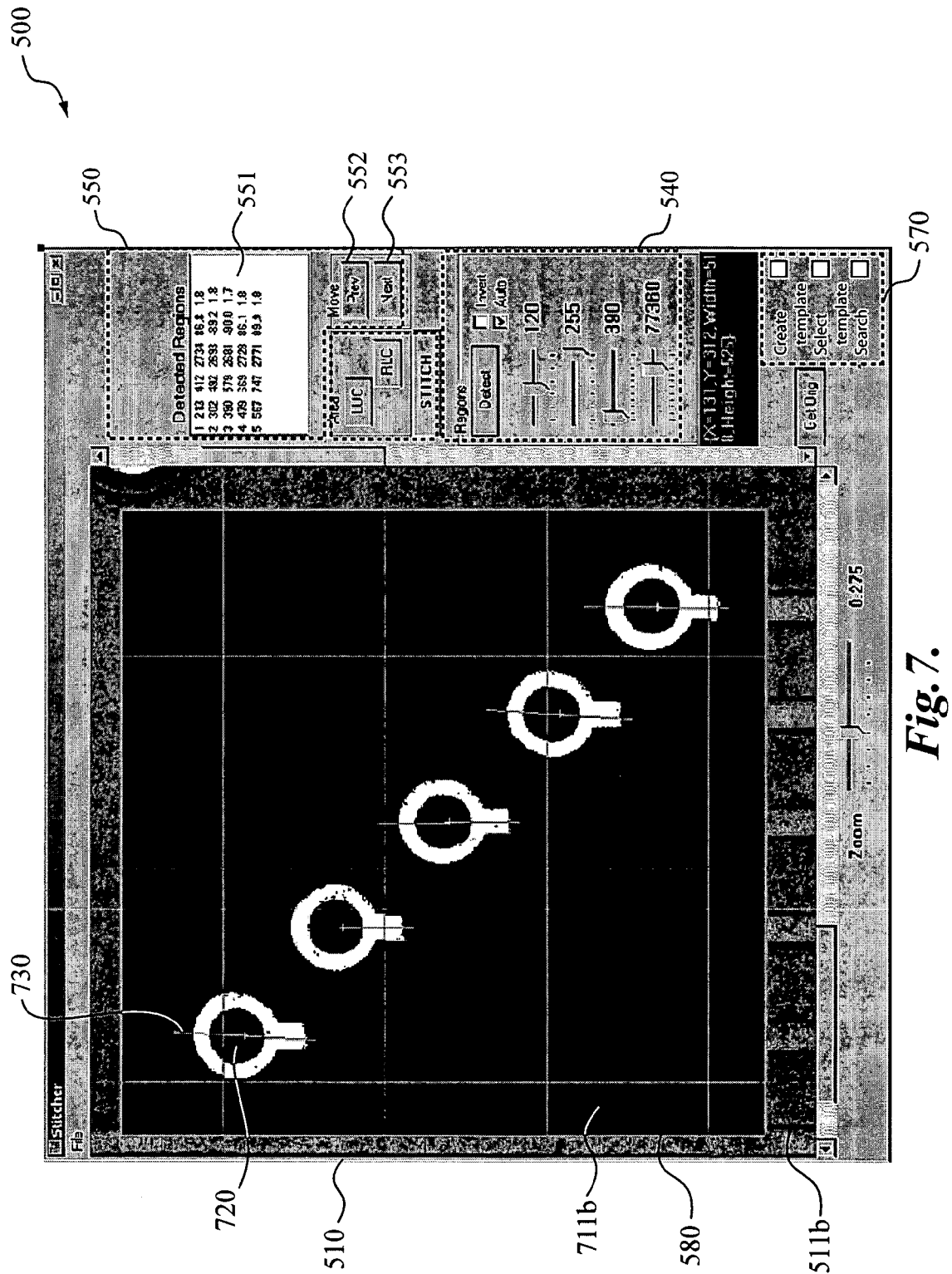
FIG. 7 is a sample screen shot illustrating the composite image portion of a user interface of FIG. 6, including a first example of region-identifying within the first workpiece composite image.

FIG. 7 shows a sample screen shot illustrating the exemplary composite image user interface portion 500 shown in FIG. 6, after region determining operations have been performed as described above, in the composite image ROI of the composite image 511b, according to the various control settings shown in FIG. 7. In this example, the determined regions are indicated using a binary image representation 711b in the display area 510, where the pixels of the binary image representation 711b remain aligned with their corresponding pixel locations in the display of the composite image 511b. As previously indicated, the determined regions indicated in the display area 510 may respond in real-time, or near real-time, to alterations in the region determining controls, and the binary image representation 711b allows the user to see the extents of the determined regions clearly.

In the exemplary embodiment shown in FIG. 7, each determined region and a number of its region characteristics are also automatically listed in a region listing area 551 of the display area 550, which may also include various controls, such as the "Prev" button 552 and the "Next" button 553, described further below, for performing operations related to the listed regions. In various embodiments, the region listing area 551 may include a scrolling control (not shown) such that the region listing area 551 may scroll and display a list having too many members to fit within the available display area 551. In the example shown in FIG. 7, the listed items for each region include, from left to right, an identification number, the x-coordinate of the centroid of the region, the y-coordinate of the centroid of the region, the area of the region in pixels, an orientation or "nominal angle" metric, and an elongation (or, conversely, roundness) metric. In addition, a centroid indicator 720 and an orientation indicator 730 may be displayed for each determined region in the binary image representation 711b.

Figure 8:
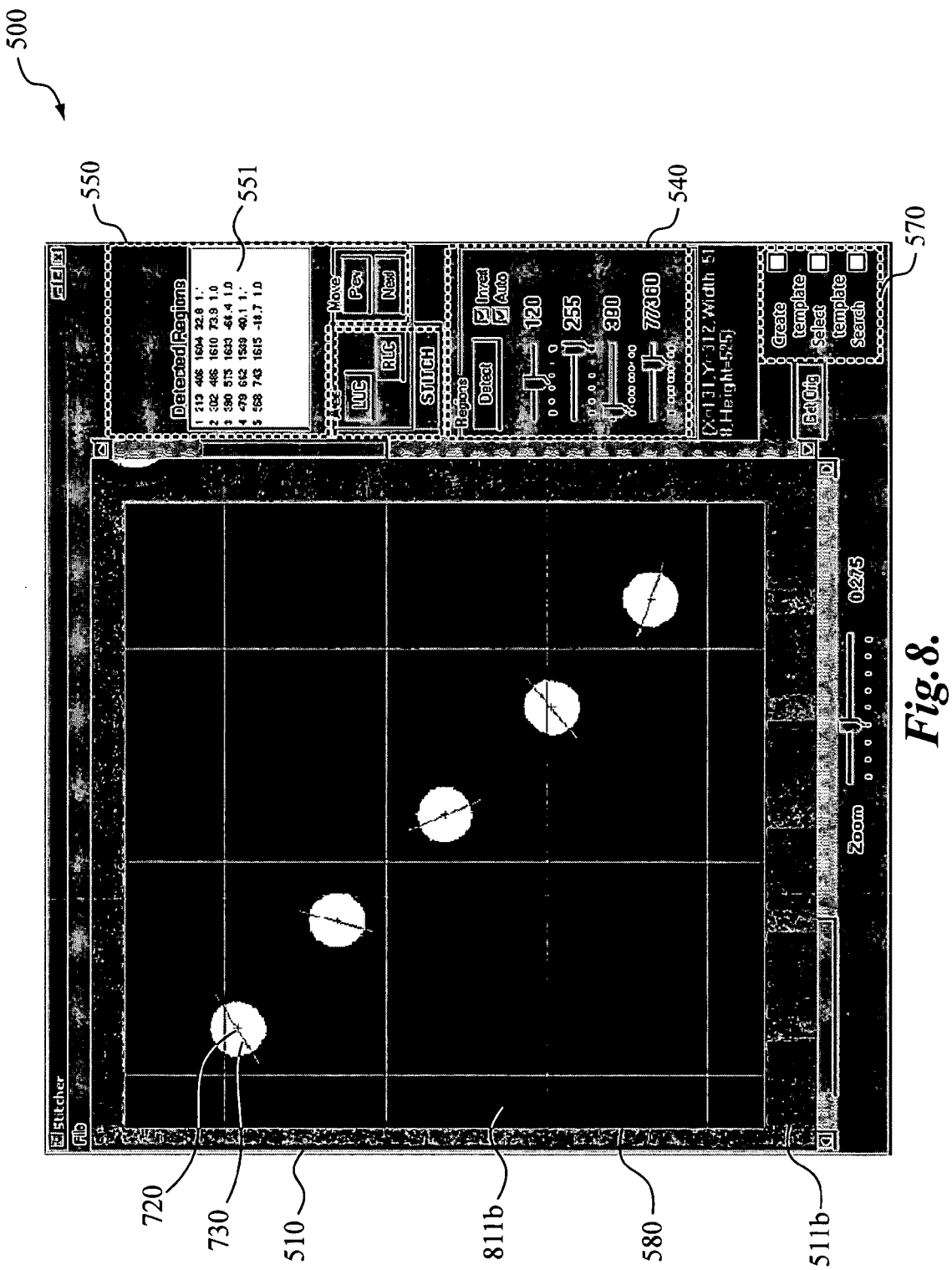
FIG. 8 is a sample screen shot illustrating the composite image portion of a user interface of FIG. 6, including a second example of region-identifying within the first workpiece composite image.

FIG. 8 shows a sample screen shot illustrating the exemplary composite image user interface portion 500 shown in FIG. 7, after the "Invert" control checkbox 545 has been checked, resulting in a new set of determined regions, as indicated in the binary image representation 811b and the region listing area 551. The various control settings shown in FIG. 8 are otherwise identical to those shown in FIG. 7. Thus, in FIG. 8, regions corresponding to holes have been identified, in contrast to FIG. 8, where regions corresponding to solder pads were identified.

Figure 9:
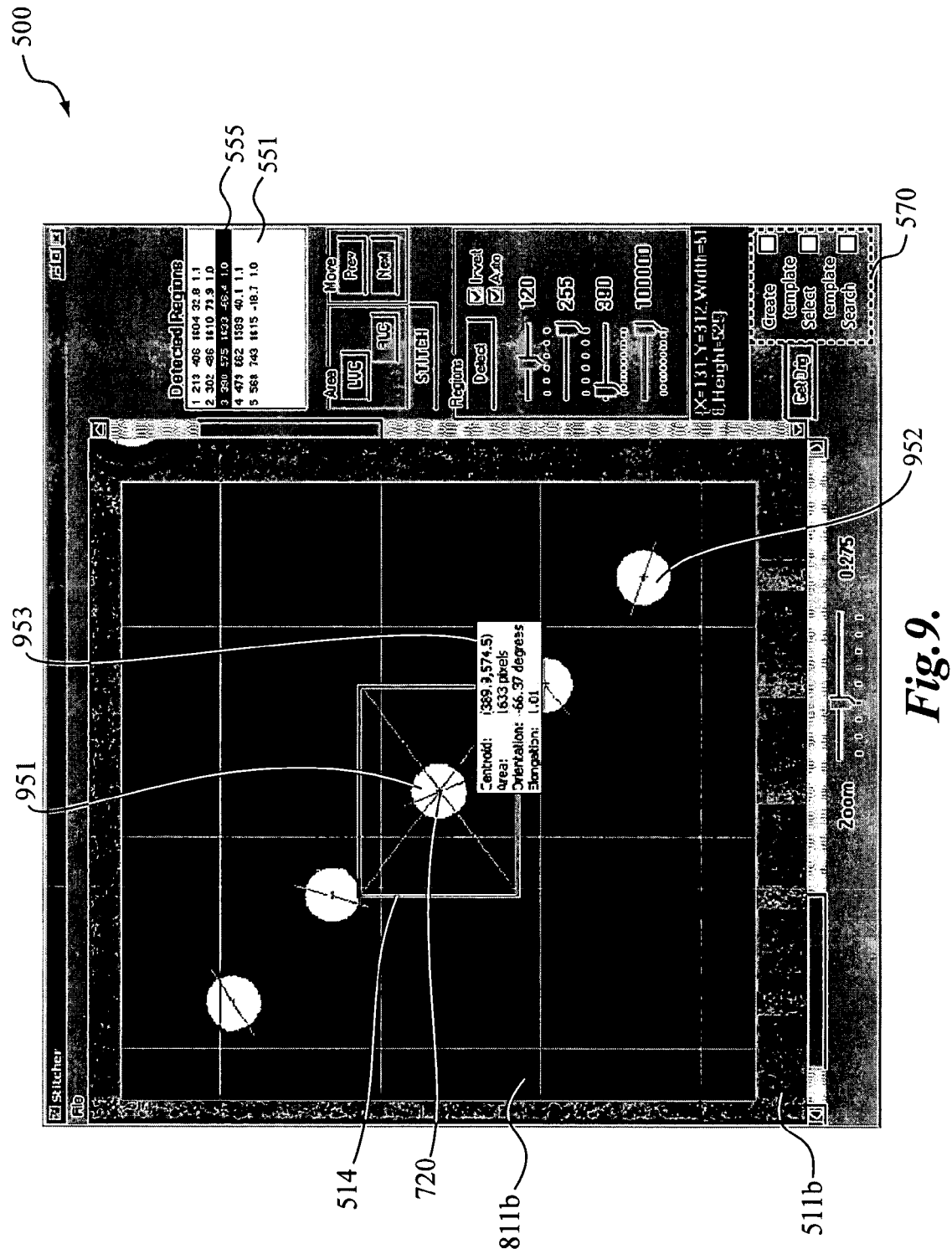
FIG. 9 is a sample screen shot illustrating the composite image portion of a user interface of FIG. 8, including an example of selecting one of the identified regions.

FIG. 9 shows a sample screen shot illustrating the exemplary composite image user interface portion 500 shown in FIG. 8, which illustrates the features of various exemplary user interface operations that may be performed in response to various user operations. In a first example, in response to the user temporarily selecting a determined region 951 indicated in the binary image representation 811b, for example, by moving a cursor close to its centroid indicator 720, an exemplary set of user interface operations may include highlighting the information of the list member corresponding to the representative determined region 951, as indicated by the highlight 555 in the region listing area 551. The exemplary set of operations may also include displaying a display box 953 proximate to the temporarily selected determined region 951. The display box 953 may include various region characteristic values corresponding to the temporarily selected determined region 951.

In a second example, in response to the user selecting the determined region 951 by "double-clicking" on the list member corresponding to the determined region 951, or by double-clicking on the determined region 951 itself, an exemplary set of user interface operations may include highlighting the information of the list member corresponding to the selected determined region, as indicated by the highlight 555. The exemplary set of operations may further include displaying the display box 953 proximate to the selected determined region 951 in the binary image representation 811b. The exemplary set of operations may further include automatically initiating a motion of the machine vision system, such that a point on the workpiece that corresponds to a point in the selected determined region 951 (e.g., its centroid) is positioned centrally in the FOV of the machine vision inspection system. As a result of that motion, a FOV indicator 514 corresponding to the location of FOV of the machine vision system relative to the composite image 511b is displayed surrounding that point in the representative determined region 951, according to FOV operations outlined previously.

Figure 10:
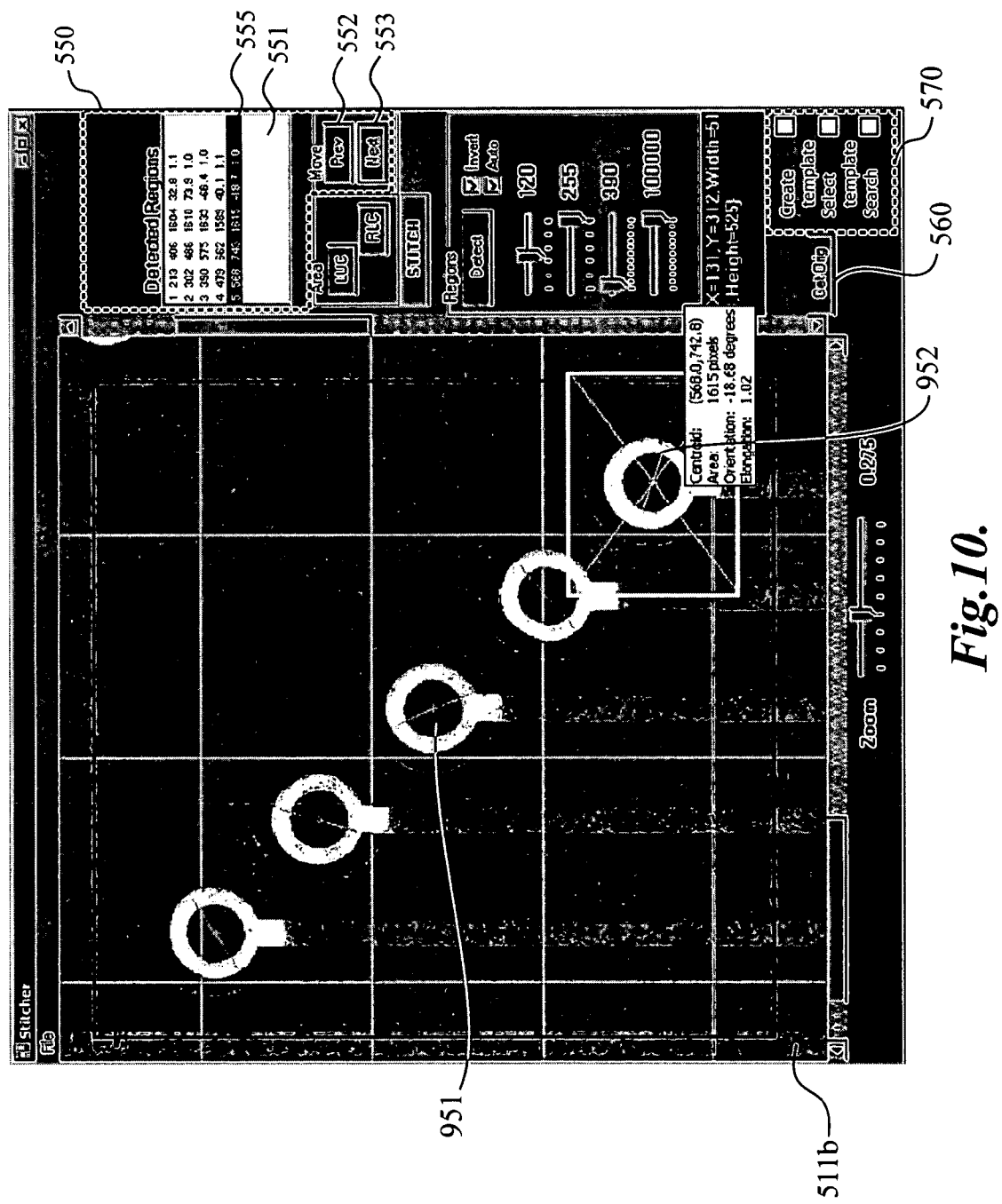
FIG. 10 is a sample screen shot illustrating the composite image portion of a user interface of FIG. 8, including an example of displaying the identified regions and including an indication of a "selected" region, in the context of the original first-workpiece composite image.

FIG. 10 shows a sample screen shot illustrating the exemplary composite image user interface portion 500 shown in FIG. 9, which illustrates the features of various exemplary user interface operations that may be performed in response to additional user operations. In response to the user activating the "GET ORIG" button 560, the underlying composite image 511b may replace the binary image representation 811b that indicates the determined regions and the determined regions may then be indicated by being displayed in color, for example, as a red overlay on the composite image 511b. Such a display configuration allows the user to more intuitively and conveniently use the indicated determined regions, and/or their corresponding members in the region listing area 551, to navigate the machine vision system to desired features on the workpiece.

Reviewing FIG. 9, the selection of the third list member, corresponding to the then-selected determined region 951, is indicated by the highlight 555 in the region listing area 551, and the FOV indicator 514 is centered about the centroid of the then-selected determined region 951. In contrast, in FIG. 10, the selection of the fifth list member, corresponding to the currently-selected determined region 952, is indicated by the highlight 555 in the region listing area 551, and the FOV indicator 514 is centered about the centroid of the currently-selected determined region 951. In various embodiments, these differences can arise in response to two different types of user operations, performed with the composite image user interface portion 500 initially in the state shown in FIG. 9. In a first example, the user may select the determined region 952 by "double-clicking" on the list member corresponding to the determined region 952, or by double-clicking on the determined region 952 itself, and in response to such double-clicking, automatic user interface operations will bring about the state shown in FIG. 10, in a manner similar to the double-click response previously described with reference to FIG. 9.

In a second example, the "Next" button 553 may be used to bring about the state shown in FIG. 10. In general, the "Next" button 553 may be used to select the list member in the region listing area 551 (and its corresponding determined region) that is next down the list from a currently-selected list member. The user interface response to such a selection using the "Next" button 553 may be the same as the previously described response to selecting a list member by double-clicking. Accordingly, with the composite image user interface portion 500 initially in the state shown in FIG. 9, the user may activate the "Next" button 553 two times, and in response automatic user interface operations will eventually bring about the state shown in FIG. 10. Regarding the "Prev" button 552, it may operate similarly to the "Next" button 553, except that it is used to select the list member (and its corresponding determined region) that is next up the list from a currently-selected list member in the region listing area 551.

It should be appreciated that the previously described region determination operations, in combination with the resulting determined region list in the region listing area 551, and the previously described features of the "Prev" button 552 and "Next" button 553, can considerably reduce the effort and confusion that may otherwise arise when attempting to locate a large number of similar features on a workpiece and create and/or program associated inspection operations, for example in a manual inspection mode and/or a learn mode of operation of a machine vision inspection system. For example, a relatively large composite image ROI, containing many similar features to be inspected, may be defined in a composite image. Then the region determination parameters may be adjusted, with real-time visual feedback as outlined above, to rapidly isolate and list all of the regions corresponding to all of the similar features included in the composite image ROI. Then, the user may simply use the "Prev" button 552 and "Next" button 553 to select successive list members in order to automatically locate their associated features in the FOV of the machine vision system, and subsequently perform any related inspection or programming operations, before selecting the next list member. The chance for overlooking a feature to be inspected, or locating the wrong feature in the FOV may thus be virtually eliminated in various applications.

As a further enhancement, in various embodiments, when the machine vision system completes a programming operation for a workpiece feature corresponding to selected determined region, the list member and the corresponding region indicated in the display area 510 may marked or coded as "programmed" or "inspected" in some manner. In one example, in learn mode, when the machine vision system completes "training" a video tool and determining the related part program instructions for a workpiece feature corresponding to a selected determined region, the text color of the list member and the color of the corresponding region indicated in the display area 510 may be changed to a color used only for indicating a "programmed" or "inspected" status. As a further enhancement, in various embodiments, the display region 550 may include a button or other control element (not shown) that may be operated by a user to manually delete a currently-selected list item and its associated region from a set of determined regions.

Figure 11:
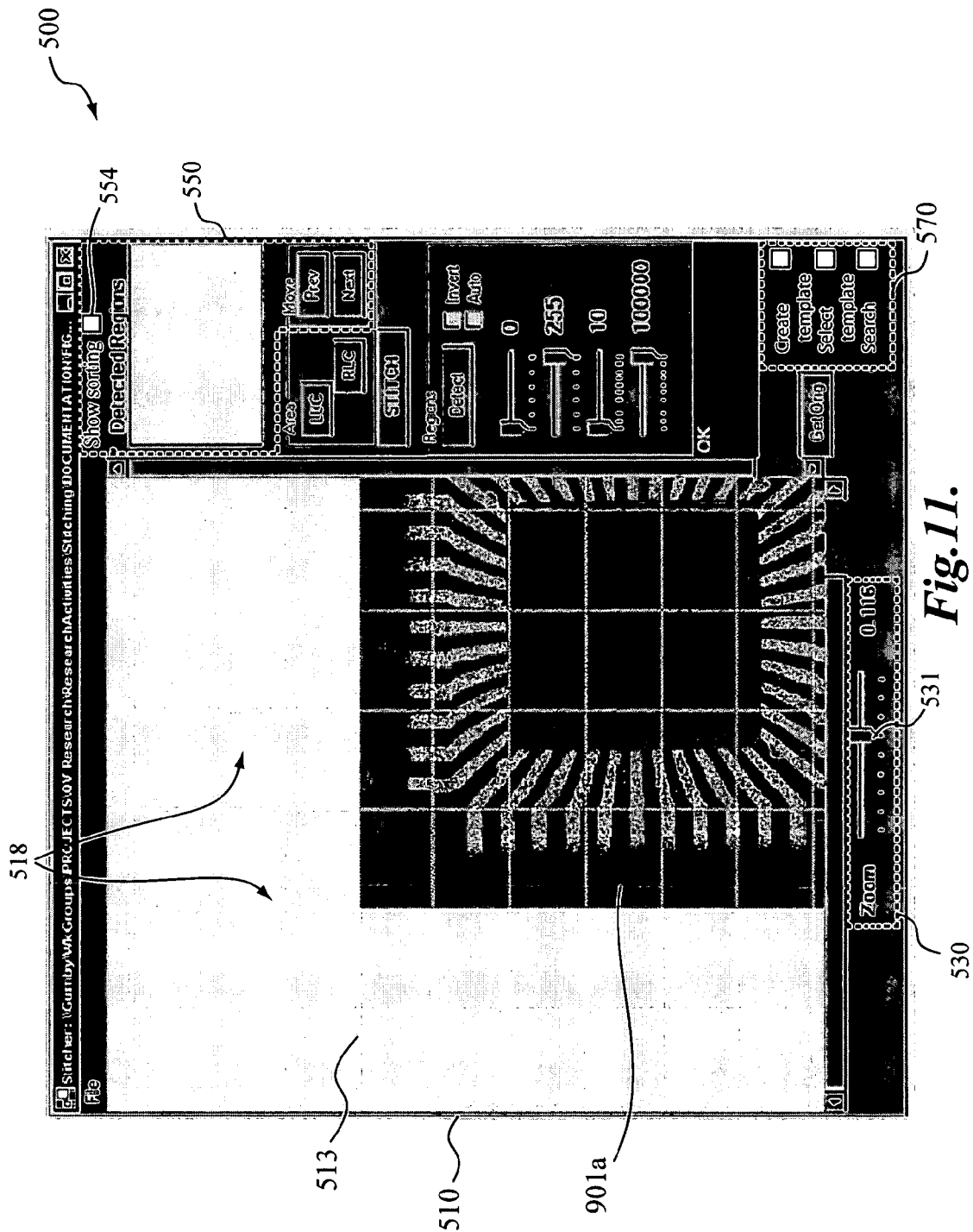
FIG. 11 is a sample screen shot illustrating a composite image portion of a user interface of a machine vision inspection system, including a second-workpiece composite image having a relative coarse pixel-resolution and a "Show Sorting" control.

FIG. 11 shows a sample screen shot illustrating the exemplary composite image user interface portion 500, including composite image user interface features which have not been previously described, and which may be included in various embodiments. An unchecked "Show sorting" checkbox control 554 included in the display area 550 is described below with reference to FIG. 12.

The example of the composite image user interface portion 500 shown in FIG. 11 includes a portion of a composite image 901a, of a different workpiece. The display portion composite image 901a is not centered in, and does not fill, the display area 510. Accordingly, a blank area 518 borders the composite image 901a in the display area 550. Such an off-centered composite image display, and the blank area 518, may be associated with desirable features in various embodiments. For example, it may be perceptually desirable that when a new composite image, having a different pixel-resolution, replaces a previously displayed composite image, in accordance with a changed setting of the zoom control slider, that the point on the workpiece that is located at the central point of the display area remains the same in the new composite image as it was in the previous composite image. Accordingly, when that central point is near the limits of a relatively high-resolution composite image (which appears relatively more magnified), as increasingly lower-resolution composite images (which appear relatively less magnified) replace the high-resolution image in the display area 510, the edges of the coverage region of the composite image appear in the display area 510 and the blank area 518 may appear or become a greater portion of the display area 510. In various embodiments, the FOV indicator 514 (not shown) may be positioned in the blank area 518, if that is its proper location relative to the displayed composite image. It will be appreciated that the blank area 518 may still spatially correspond to the workpiece, but simply falls outside of the composite image coverage region.

Figure 12:
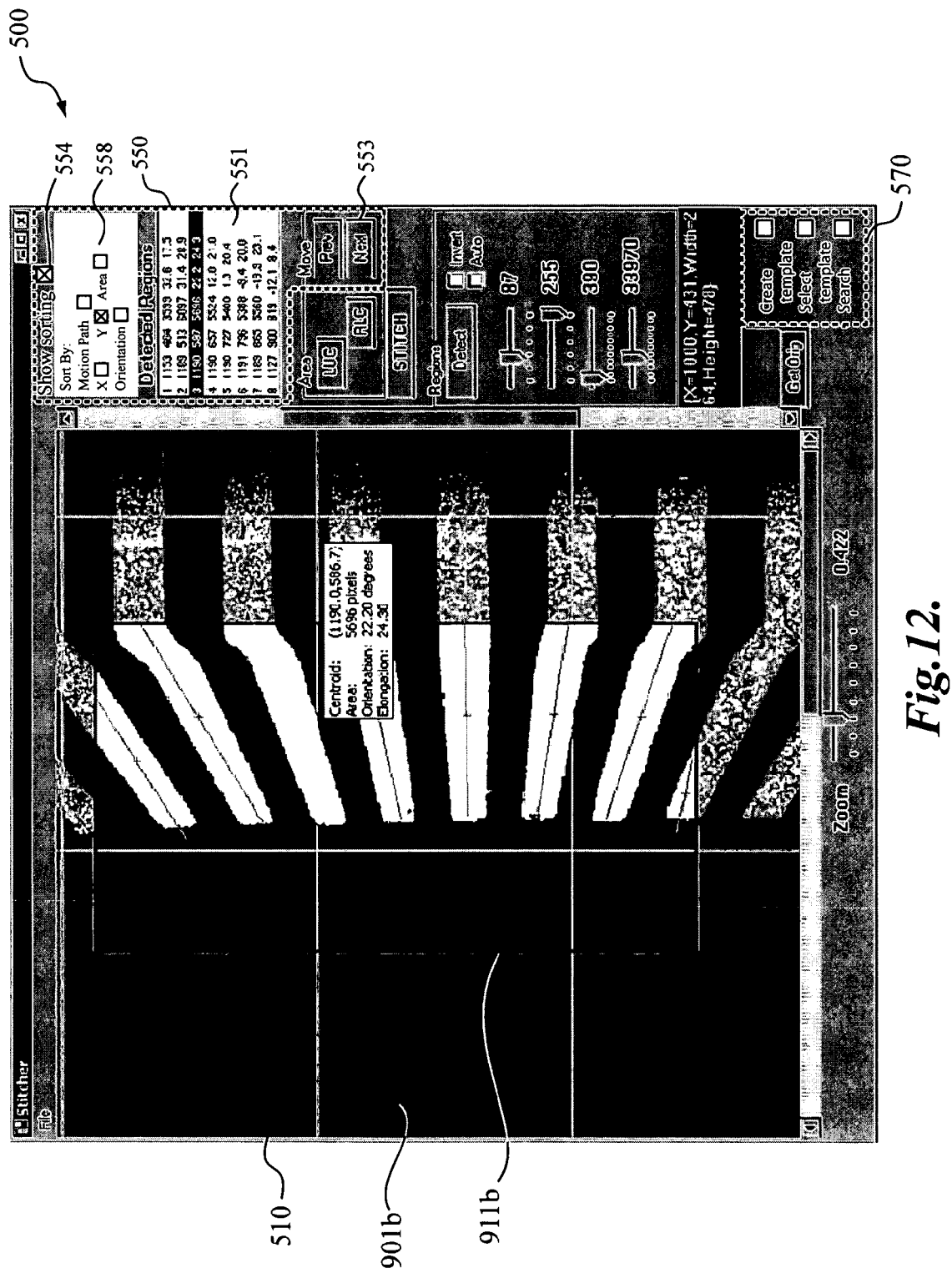
FIG. 12 is a sample screen shot illustrating the composite image portion of a user interface of FIG. 11, including an example of region-identifying and showing an example of Sorting Controls for the identified regions.

FIG. 12 shows a sample screen shot illustrating the exemplary composite image user interface portion 500 shown in FIG. 11, with a different location of a different composite image 901b displayed in the display area 510. It will be understood that the underlying complete composite image 901b covers the entire composite image coverage region, as does the composite image 901a (see FIG. 11), except the composite image 901b has a higher pixel-resolution, and therefore is shown "magnified" relative to the composite image 901a. The method of showing and listing a set of determined regions indicated in the binary image representation 901b, as well as other features of the example of the composite image user interface portion 500 shown in FIG. 12, may be understood based on previous descriptions.

In FIG. 12, the "Show sorting" checkbox control 554 included in the display area 550 is checked. In response, various sorting parameter controls may be displayed in a sorting parameter display area 558. In the example shown in FIG. 12, some of the sorting parameter controls are checkbox controls corresponding to some of the region parameters listed in the region listing area 551, including the region centroid "X" coordinate, "Y" coordinate, region "Area" and "Orientation". When one of the sorting parameter checkbox controls is checked, the determined region list displayed in the region listing area 551 is sorted or re-ordered, according to an ascending value order (or descending value order, in some embodiments) for the corresponding region characteristic values listed in the region listing area 551. In the example shown in FIG. 12, the "Y" coordinate checkbox control is checked, and the list of determined regions is ordered accordingly.

One other sorting parameter control that may be displayed in the sorting parameter display area 558 is a checkbox control labeled "Motion Path". The Motion Path sorting parameter is a computed sorting parameter. When checked, the motion path parameter control automatically initiates operations that use the X and Y centroid coordinates of each region (corresponding to its nominal position) to automatically determine an efficient motion path that connects all of the centroid locations (e.g. the shortest path found by a path optimizing algorithm). Any suitable now-known or later-developed motion path planning algorithm may be used for automatically determining the efficient motion path. Then, the determined region list displayed in the region listing area 551 is sorted or re-ordered into the same order as the region centroid sequence corresponding to the efficient motion path. The motion path sorting parameter is advantageous for many applications. For example, once the region list members have been sorted based on this parameter, if the "Next" button 553 is then used to sequentially "select" the list members during learn mode operations (which causes the machine vision system to move the corresponding region and features into the FOV, as previously described), and inspection operations are programmed and recorded for the corresponding features in the same order, then consequently an efficient motion path will be recorded in the resulting part program.

Figure 13:
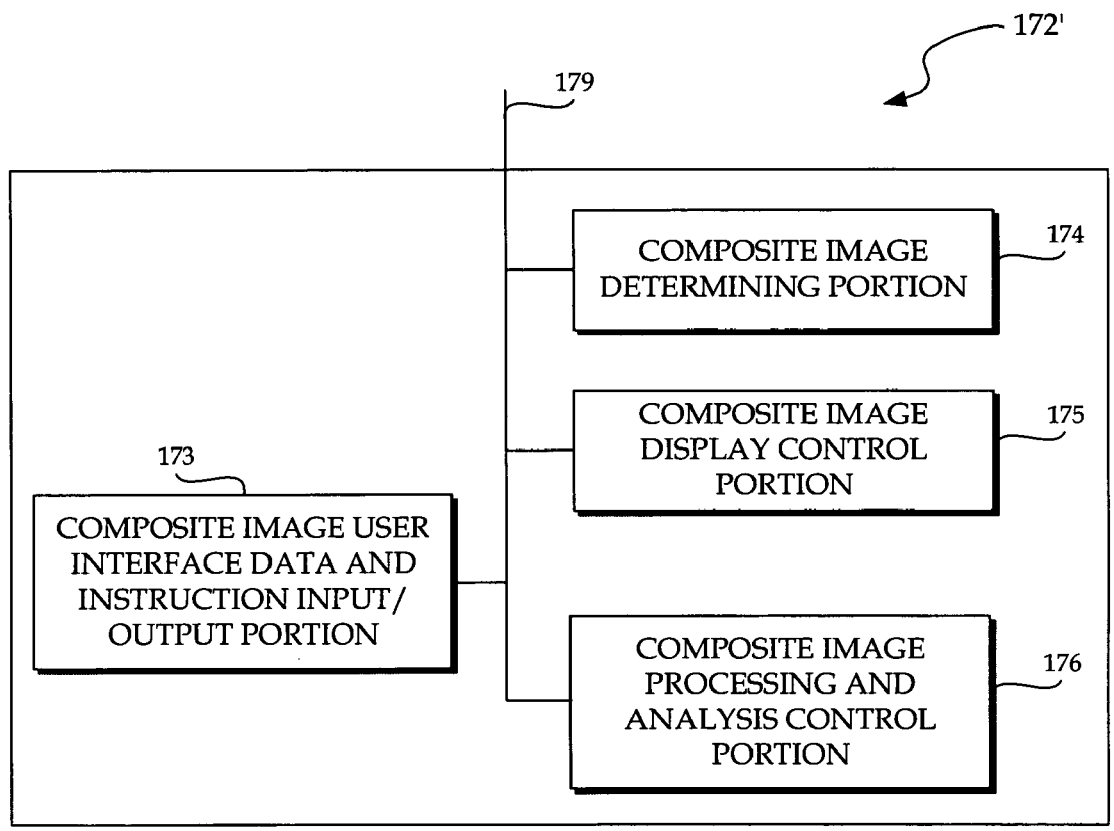
FIG. 13 is a diagram showing one implementation of a composite image interface portion usable with the control system portion of FIG. 2.

FIG. 13 is a block diagram showing one implementation of a composite image user interface control portion 172' that is usable as the composite image user interface control portion 172 in the control system portion 120, shown in FIG. 2. The composite image user interface control portion 172' includes a composite image determining portion 174, a composite image display control portion 175, a composite image processing and analysis control portion 176, and a composite image interface data and instruction input/output portion 173, all interconnected to each other and to the control system portion 120 shown in FIG. 2, by one or more data and control signal paths represented by the lines 179 in FIG. 13.

As previously indicated, a composite image user interface portion, e.g. the composite image user interface portion 500, may be implemented as an integrated window of a machine vision system user interface, as a "client" application through an applications programming interface (API), incorporated in a specialized client application program, or as a stand-alone client program. The composite image user interface portion may also be implemented as a stand-alone program which is designed to share data and instructions with other programs or applications. The structure of the embodiment of the composite image user interface control portion 172' shown in FIG. 13 and described below is a "self-contained" structure that is readily adaptable to any or all of these implementations.

In one embodiment, the composite image determining portion 174 comprises a circuit or routine that is designed to perform operations that may include operations corresponding to the operations of the blocks 410-450, described with reference to FIG. 4, and/or operations described in association with the display area 520, and more generally relating to the creation and storing of a set of composite images. In one embodiment, the composite image display control portion 175 comprises a circuit or routine that is designed to perform operations that may include operations corresponding to the operations of the block 460, described with reference to FIG. 4, and/or operations described in association with the display areas 510, 530 and 560, and more generally relating to the display of a set of composite images. In one embodiment, the composite image processing and analysis control portion 176 comprises a circuit or routine that is designed to perform operations that may include operations described in association with the display areas 540, 550, and 570, and in association with various methods of indicating determined regions and the like, and more generally relating to image processing and/or analyzing the composite images and displaying the results.

In one embodiment, the composite image interface data and instruction input/output portion 173 comprises a circuit or routine that is designed to perform any operations that may be required in order to support any of the operations described above that rely on the exchange of data and/or instructions and/or event notifications or the like between a composite image user interface portion and a machine vision system control system portion, for example data and/or instructions and/or event notifications associated with the operation of the FOV indicator 514, or selection of a determined region and the resulting motion control, current magnification information, machine vision system configuration and specification data such as camera pixel specifications, etc.

In various embodiments where the composite image user interface portion, e.g. the composite image user interface portion 500, is implemented as an integrated window of a machine vision system user interface, the composite image interface data and instruction input/output portion 173 may be merged with or indistinguishable from the controller 125 shown in FIG. 2. However, in various embodiments where the composite image user interface portion is implemented as a client application, e.g., through an API, the composite image interface data and instruction input/output portion 173 may be included entirely in the client application, along with the other elements of the composite image user interface control portion 172' and may monitor and/or govern transmissions of information to and from the client application through the API.

In general, information that the composite image user interface control portion 172' may need to request or otherwise obtain from various parts of a machine vision system control portion (or its API), may include, for example, the current X-Y position in the machine coordinate system (MCS), the current image size, the current pixel size (or, more generally information which allows the current magnification to be determined), the current video image data (when capturing images to be assembled into the highest-resolution composite image). Action or control requests from the composite image user interface control portion 172' to various parts of a machine vision system control portion (or its API), may include, for example, "Move stage to MCS coordinates "(X,Y)", and lighting change and/or focus change requests (for example, when acquiring the video images over the coverage area). Action or control requests from various parts of a machine vision system control portion (or its API) to the composite image user interface control portion 172', may include, for example, "Update display based on new parameters (A,B,C . . . )", where, for example, the FOV indicator position may be updated to correspond to position parameters, or magnification parameters, or the like.

While exemplary methods, user controls, user interface arrangements, and sequences of operations have been outlined when describing various exemplary embodiments of the composite image user interface portion, it will be appreciated that in other exemplary embodiments certain operations may be performed in other sequences and/or one or more of the described methods, user controls, user interface arrangements, and other disclosed features may be modified or omitted, and the other inventive aspects of the systems and methods disclosed herein may still provide substantial benefits. Thus, while the preferred embodiment of the invention has been illustrated and described, it will be appreciated that various changes can be made therein without departing from the spirit and scope of the invention.

The invention claimed is:

1. A method for operating a machine vision system, the method usable when defining inspection operations for a inspecting a workpiece, the machine vision system comprising:
   a camera system;
   a controller;
   at least one display;
   a motion system usable to provide a relative motion between the camera system and the workpiece; and
   a user interface displayed on the at least one display, the user interface including a plurality of user-controllable control elements and at least one image of the workpiece, the method comprising:
   acquiring a plurality of images of the workpiece using the camera system, the acquired images having an acquired image pixel-resolution;
   determining and storing a first respective composite image of the workpiece based on the plurality of acquired images, wherein the first respective composite image has a first respective pixel-resolution and includes a larger area of the workpiece than is included in each one of the plurality of acquired images;
   determining and storing at least one additional respective composite image of the workpiece based on at least one of a) the plurality of acquired images and b) the first composite image, wherein each additional respective composite image has a corresponding respective pixel-resolution that is coarser than the first respective pixel-resolution and includes a larger area of the workpiece than is included in each one of the plurality of acquired images;
   displaying a composite image zoom control in the user interface, the composite image zoom control usable to select which respective composite image is displayed;
   displaying one of the stored respective composite images depending on a state of the zoom control; and
   when the zoom control is altered to a different state, immediately displaying a different one of the stored respective composite images in accordance with the state of the zoom control.

2. The method of claim 1, wherein the first respective pixel-resolution is a resolution included in a group consisting of a) the acquired image pixel-resolution, b) at least one-half the acquired image pixel-resolution, c) at least one-quarter the acquired image pixel-resolution, d) a pixel-resolution determined based at least partly on a number of acquired images used to determine the first respective composite image, e) a pixel-resolution determined based at least partly on a maximum number of pixels allowed in the first respective composite image, and f) a pixel-resolution determined based at least partly on a maximum storage limit allowed for the first respective composite image and the at least one additional respective composite image.

3. The method of claim 1, wherein the at least one additional respective composite image of the workpiece comprises at least three additional respective composite images.

4. The method of claim 3, wherein the at least three additional respective composite images of the workpiece comprise at least six additional respective composite images.

5. The method of claim 4, wherein the at least six additional respective composite images of the workpiece comprise at least nine additional respective composite images.

6. The method of claim 1, further comprising displaying a set of region parameter controls in the user interface, the region parameter controls usable to define at least one region parameter usable to at least partly determine a set of regions identified based on at least one of the composite images.

7. The method of claim 6, further comprising:
determining the set of regions depending on a state of the set of region parameter controls; and
indicating the determined set of regions in at least one region-indicating image that corresponds to a composite image.

8. The method of claim 7, further comprising:
immediately determining a different set of regions depending on a different state of the set of region parameter controls when the set of region parameter controls is altered to the different state; and
immediately indicating the different set of regions in at least one region-indicating image that corresponds to a composite image.

9. The method of claim 7, further comprising:
displaying a region-listing portion in the user interface; and
displaying a list of the determined set of regions using the region-listing portion.

10. The method of claim 9, wherein displaying the list comprises displaying, for each member of the list, a region identifier and at least one region characteristic, the at least one region characteristic comprising a) a location parameter, b) a size parameter, c) an orientation parameter, and d) a shape parameter.

11. The method of claim 10, further comprising:
displaying at least one list-sorting control element in the user interface, the at least one list-sorting control element usable to define at least one region characteristic usable to govern a list sorting operation; and
performing a list sorting operation that reorders the displayed list based on a region characteristic defined using the list-sorting portion.

12. The method of claim 9, wherein the user interface comprises, for each member of the list, at least one of a) an indicator that indicates whether an inspection operation has been defined corresponding to the region associated with the member of the list, and b) a control element that allows a user to delete the member from the list.

13. The method of claim 12, the method further comprising deleting the indication in at least one region-displaying image of a respective one of the determined set of regions in response to the user deleting the corresponding respective member from the list.

14. The method of claim 9, further comprising:
the user selecting a respective one of the determined regions by at least one of a) operations including positioning a cursor on the respective one of the determined regions indicated in the at least one region-displaying image, and b) operations including selecting a respective member of the list that corresponds to the respective one of the determined regions;
the user initiating a relative motion of the machine vision system based on the respective one of the determined regions; and
providing the relative motion automatically such that a point on the workpiece that corresponds to a point within the respective one of the determined regions is positioned in the field of view of the camera system, in response to the user initiating the relative motion.

15. The method of claim 7, further comprising:
including composite image region-of-interest defining operations in the user interface; and
defining a composite image region-of-interest using the composite image region-of-interest defining operations and displaying the defined region-of-interest in a composite image,
wherein the step of determining the set of regions comprises determining the set of regions only within the defined composite image region-of-interest.

16. The method of claim 1, wherein the user interface further comprises a field of view indicator, the method further comprising:
displaying a field-of-view image corresponding to a current field of view of the camera system in a camera image display area of the user interface;
displaying at least one of a composite image and a region indicating image that corresponds to a composite image in a composite image display area of the user interface; and
displaying the field-of-view indicator in the composite image display area of the user interface at a position that corresponds to a nominal position of the field-of-view image relative to the image in the composite image display area of the user interface, if the location of the field-of-view image relative to the image in the composite image display area falls within the composite image display area of the user interface.

17. The method of claim 16, wherein the field-of-view indicator further indicates a nominal size of the field of view image relative to the image in the composite image display area of the user interface.

18. The method of claim 17, wherein the field-of-view indicator is modified immediately when the field-of-view image is modified due to at least one of a relative motion and a magnification change of the machine vision system.

19. The method of claim 16, further comprising displaying a grid overlaying the image displayed in the composite image display area of the user interface, wherein a spacing between elements of the grid corresponds to at least one of a) a spacing used for the step of acquiring a plurality of acquired images, b) a spacing corresponding to a nominal size of the field of view image within the image in the composite image display area of the user interface, c) a user-defined spacing, d) a spacing corresponding to a length increment on the workpiece, and e) a default spacing.

20. The method of claim 16, further comprising:
the user positioning a cursor at selected position relative to the image in the composite image display area of the user interface;
the user initiating a relative motion of the machine vision system based on the selected position; and
providing a relative motion such that a point on the workpiece that corresponds to the selected point is positioned in the field of view of the camera system, in response to the user initiating the relative motion.

* * * * *